US008064503B2

(12) United States Patent
Yuda et al.

(10) Patent No.: US 8,064,503 B2
(45) Date of Patent: Nov. 22, 2011

(54) MULTICARRIER COMMUNICATION APPARATUS AND MULTICARRIER COMMUNICATION METHOD

(75) Inventors: Yasuaki Yuda, Kanagawa (JP); Tomohiro Imai, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 643 days.

(21) Appl. No.: 11/576,039

(22) PCT Filed: Sep. 26, 2005

(86) PCT No.: PCT/JP2005/017617
§ 371 (c)(1),
(2), (4) Date: Mar. 26, 2007

(87) PCT Pub. No.: WO2006/035704
PCT Pub. Date: Apr. 6, 2006

(65) Prior Publication Data
US 2007/0263736 A1  Nov. 15, 2007

(30) Foreign Application Priority Data
Sep. 28, 2004  (JP) .................................. 2004-282671

(51) Int. Cl.
*H04B 1/38* (2006.01)
*H04W 4/00* (2009.01)
(52) U.S. Cl. ........ 375/221; 375/219; 375/220; 375/260; 370/329; 370/330; 370/464; 370/465
(58) Field of Classification Search .......... 375/219–221, 375/295, 315, 309–310, 316, 326, 334–335, 375/343, 356, 358; 370/464, 465, 482, 485, 370/491; 455/39, 702, 703, 40–71, 130, 455/150.1, 151.1, 203, 91, 103, 104, 116, 455/119
See application file for complete search history.

(56) References Cited

U.S. PATENT DOCUMENTS 6,701,129 B1 * 3/2004 Hashem et al. ............ 455/67.11
7,161,896 B1 * 1/2007 Hart et al. ..................... 370/206
7,280,625 B2 * 10/2007 Ketchum et al. ............. 375/343
7,298,785 B2 * 11/2007 Suzuki .......................... 375/260

(Continued)

FOREIGN PATENT DOCUMENTS

JP        2002198878        7/2002

(Continued)

OTHER PUBLICATIONS

Li et al, "Proposal of Determining the number of subcarriers for MC-CDMA systems", ICSP'04 Proceedings, 2004, pp. 1769-1772.*

(Continued)

*Primary Examiner* — David Payne
*Assistant Examiner* — Linda Wong
(74) *Attorney, Agent, or Firm* — Dickinson Wright PLLC

(57) ABSTRACT

A multicarrier communication apparatus and the like wherein the arithmetic amount required for calculating a reception weight by which a multicarrier signal is to be multiplied is suppressed, while the reception characteristic for the multicarrier signal is improved. In the apparatus, a subcarrier transmission weight generating part (513) generates a transmission weight of each subcarrier, based on channel information of each subcarrier received from a channel information generating part (511) and a reception weight of each subcarrier group received from a subcarrier group reception weight generating part (512). The subcarrier transmission weight generating part (513) inputs the generated transmission weights of the respective subcarriers to the corresponding ones of multipliers (522).

14 Claims, 19 Drawing Sheets

U.S. PATENT DOCUMENTS

| | | | |
|---|---|---|---|
| 7,486,735 B2 * | 2/2009 | Dubuc et al. | 375/260 |
| 7,751,369 B2 * | 7/2010 | Kishigami et al. | 370/334 |
| 2002/0085653 A1 | 7/2002 | Matsuoka et al. | |
| 2004/0076172 A1 * | 4/2004 | Sano | 370/442 |
| 2005/0018597 A1 | 1/2005 | Yuda | |
| 2005/0058097 A1 * | 3/2005 | Kang et al. | 370/329 |
| 2005/0059366 A1 * | 3/2005 | Choi et al. | 455/130 |
| 2005/0111406 A1 * | 5/2005 | Pasanen et al. | 370/329 |
| 2006/0002362 A1 * | 1/2006 | Subrahmanyam et al. | 370/345 |
| 2006/0056531 A1 * | 3/2006 | Li et al. | 375/267 |
| 2006/0154608 A1 * | 7/2006 | Fukuoka et al. | 455/67.13 |
| 2006/0246916 A1 * | 11/2006 | Cheng et al. | 455/450 |
| 2008/0043827 A1 * | 2/2008 | Renfors et al. | 375/230 |
| 2008/0080630 A1 * | 4/2008 | Sung | 375/260 |

FOREIGN PATENT DOCUMENTS

| | | |
|---|---|---|
| JP | 2003258770 | 9/2003 |
| WO | 2004/013993 | 2/2004 |
| WO | WO 2004013993 A1 * | 2/2004 |

OTHER PUBLICATIONS

PCT International Search Report dated Nov. 8, 2005.
Chinese Office Action dated Feb. 5, 2010.

* cited by examiner

MULTICARRIER COMMUNICATION APPARATUS AND MULTICARRIER COMMUNICATION METHOD

TECHNICAL FIELD

The present invention relates to a multicarrier communication apparatus that transmits and receives a multicarrier signal such as an OFDM (Orthogonal Frequency Division Multiplexing) signal, and a method thereof.

BACKGROUND ART

Currently, research and development relating to fourth-generation mobile communication systems is being carried out, and transmission methods for implementing high-speed, high-capacity data transmission are being investigated. One of these transmission methods is OFDM transmission. With regard to OFDM transmission, a technique is known that reduces the amount of computational processing for calculating a weight for each subcarrier when an OFDM signal is received by a smart antenna (adaptive array antenna) (see Patent Document 1, for example).

In the technique described in Patent Document 1, weight generation per subcarrier is avoided, and the associated amount of computational processing reduced, by grouping together a plurality of subcarriers and using the same weight for all the subcarriers in that subcarrier group.

FIG. 1 shows an overview of a radio communication system that uses the technique described in Patent Document 1. In the radio communication system shown in FIG. 1, a transmitting apparatus and a receiving apparatus each equipped with a smart antenna both set one group by gathering together a plurality of adjacent subcarriers in an OFDM signal, and transmit/receive an OFDM signal weighted using weights Wr'0 through Wr'm−1 for individual subcarrier groups.

Patent Document 1: Japanese Patent Application Laid-Open No. 2002-198878

DISCLOSURE OF INVENTION

Problems to be Solved by the Invention

However, a problem with the technique described in Patent Document 1 is that, since weighting is performed by multiplying all subcarriers in one subcarrier group by the same weight, the greater the difference in channel conditions between subcarriers or the temporal fluctuation of channel conditions, the greater is the degradation of multicarrier signal reception characteristics.

Specifically, as shown in FIG. 2, if all subcarriers composing group 1 are multiplied by the same weight in the receiving apparatus, the reception level of each subcarrier generally rises, but the difference in reception level or phase between subcarriers does not decrease, and therefore the problem of degradation of multicarrier signal reception characteristics due to differences in channel conditions between subcarriers cannot be solved by the technique described in Patent Document 1.

It is an object of the present invention to provide a multicarrier communication apparatus and multicarrier communication method that improve the reception characteristics of a multicarrier signal while reducing the amount of computational processing necessary for calculating a reception weight by which that multicarrier signal is multiplied.

Means for Solving the Problems

A multicarrier communication apparatus according to the present invention is a multicarrier signal transmitting-side multicarrier communication apparatus, being a communication apparatus that performs radio transmission of a multicarrier signal to a receiving-side communication apparatus that performs weighting by multiplying a plurality of subcarriers composing one subcarrier group by the same reception weight, and employing a configuration that includes: a transmission weight generation section that generates a transmission weight per subcarrier based on the reception weight per subcarrier group and channel information per subcarrier; a weighting section that performs weighting by multiplying a generated transmission weight by a corresponding subcarrier; and a transmitting section that performs radio transmission of a weighted multicarrier signal.

Also, a multicarrier communication apparatus according to the present invention is a multicarrier signal receiving-side multicarrier communication apparatus employing a configuration that includes: a receiving section that receives a multicarrier signal weighted by multiplying each subcarrier by a transmission weight; and a weighting section that performs weighting for a received multicarrier signal by multiplying each subcarrier group composed of a plurality of subcarriers by one reception weight.

A multicarrier communication method according to the present invention includes: a channel information generation step of generating channel information of each subcarrier in a received multicarrier signal based on that multicarrier signal; a reception weight generation step of generating a reception weight of each subcarrier group composed of a plurality of subcarriers based on generated channel information per subcarrier; a transmission weight generation step of generating a transmission weight per subcarrier based on a generated reception weight per subcarrier group and generated channel information per subcarrier; a transmission weighting step of performing weighting for a multicarrier signal by multiplying a generated transmission weight by a corresponding subcarrier; a transmitting step of performing radio transmission of a weighted multicarrier signal; a receiving step of receiving a multicarrier signal transmitted as a radio signal; and a reception weighting step of performing weighting for a received multicarrier signal by multiplying a plurality of subcarriers composing one subcarrier group by the same reception weight.

Advantageous Effect of the Invention

According to the present invention, a transmission weight multiplied by a multicarrier signal in a transmitting-side multicarrier communication apparatus is adjusted adaptively on a subcarrier-by-subcarrier basis according to channel conditions per subcarrier so that the reception levels and phases of a plurality of subcarriers in one subcarrier group become uniform in a receiving-side multicarrier communication apparatus, thereby enabling the reception characteristics of a multicarrier signal to be improved while reducing the amount of computational processing for reception weights in the receiving-side multicarrier communication apparatus.

BEST MODE FOR CARRYING OUT THE INVENTION

Embodiments of the present invention will now be described in detail with reference to the accompanying drawings.

Embodiment 1

Figure 1:
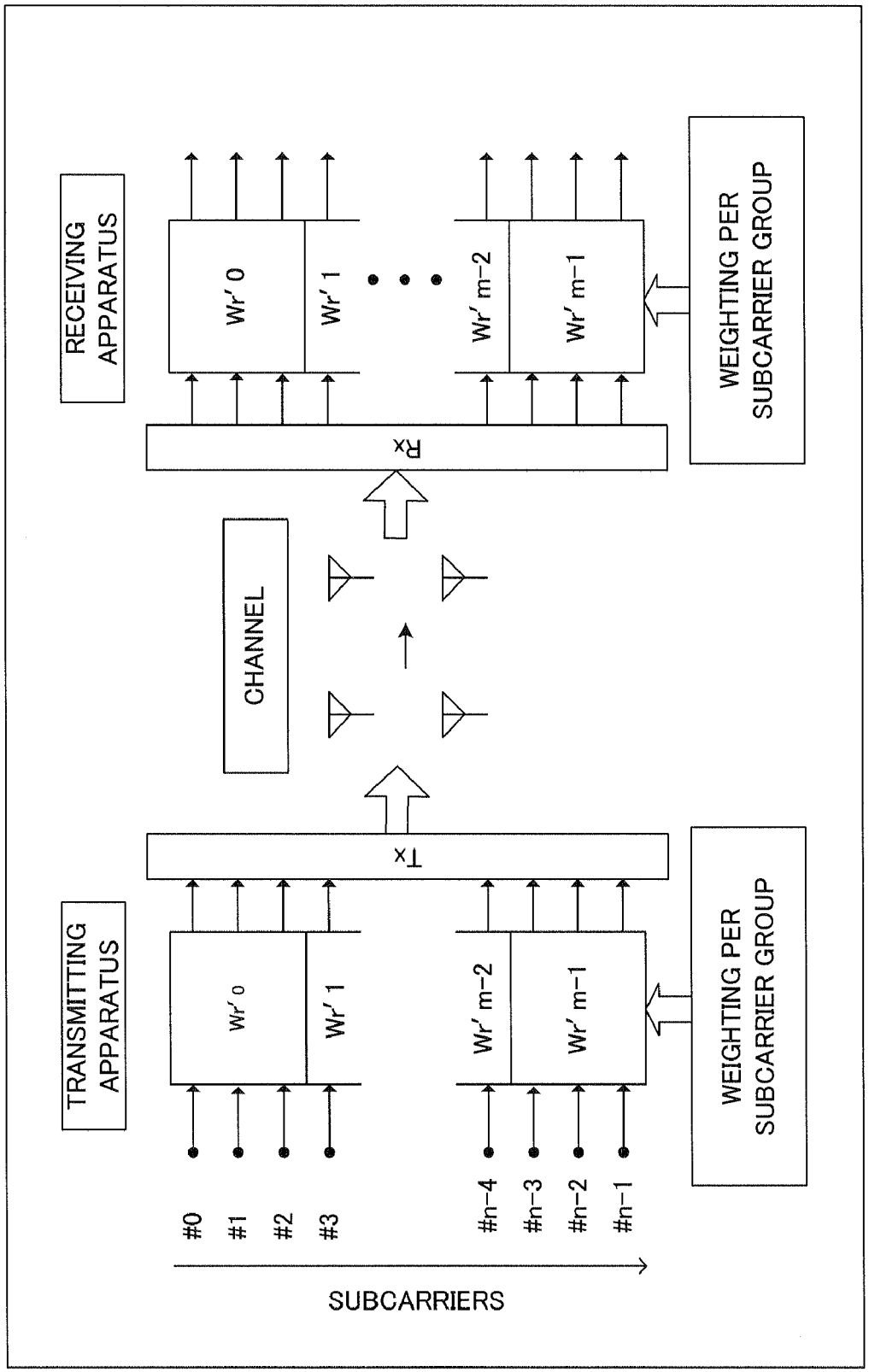
FIG. 1 is a conceptual diagram showing the relationship between weights used by a conventional transmitting-side multicarrier communication apparatus and weights used by a receiving-side multicarrier communication apparatus.
Figure 2:
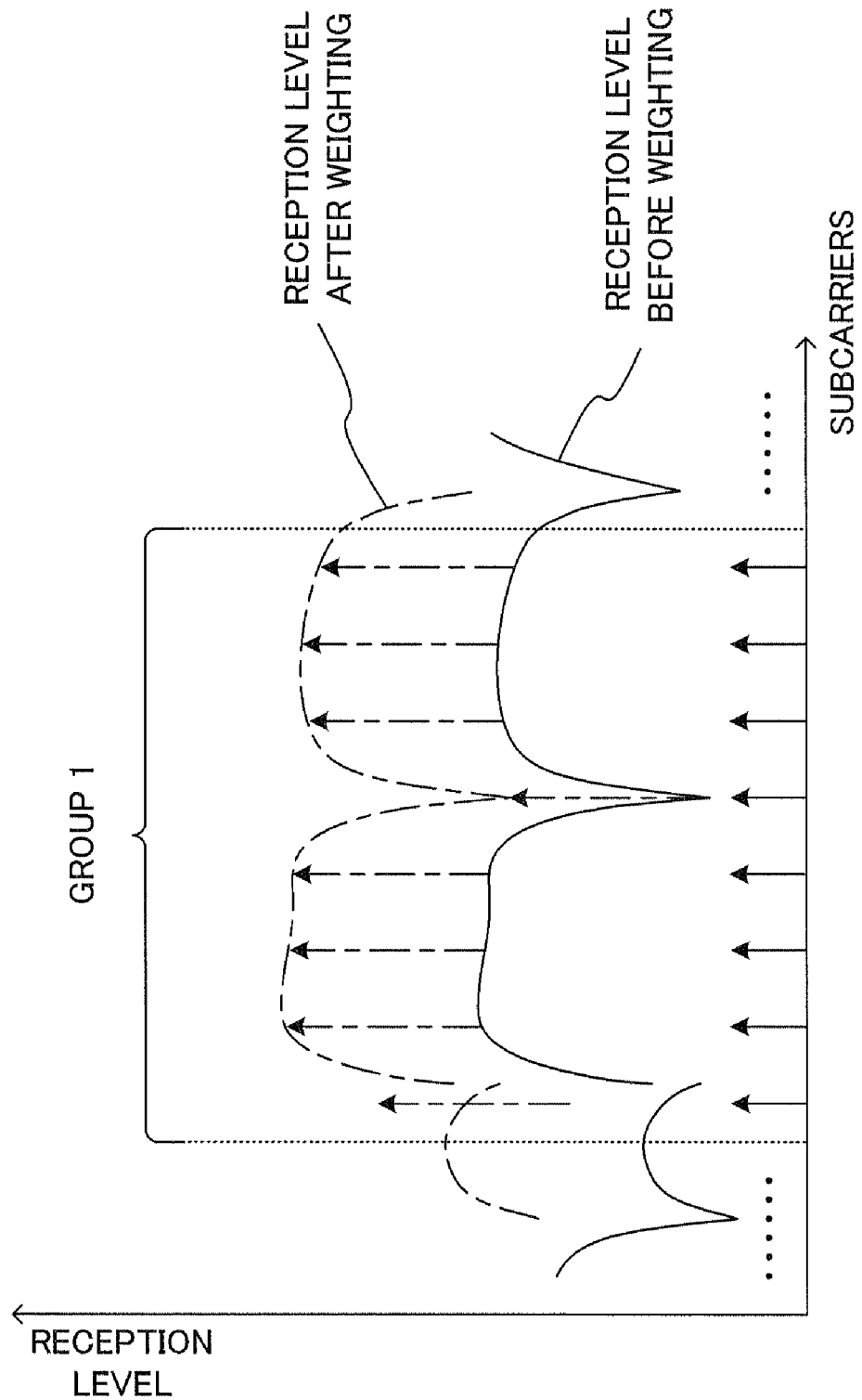
FIG. 2 is a drawing explaining the result of multiplying a multicarrier signal by weights according to a conventional multicarrier communication apparatus.
Figure 3:
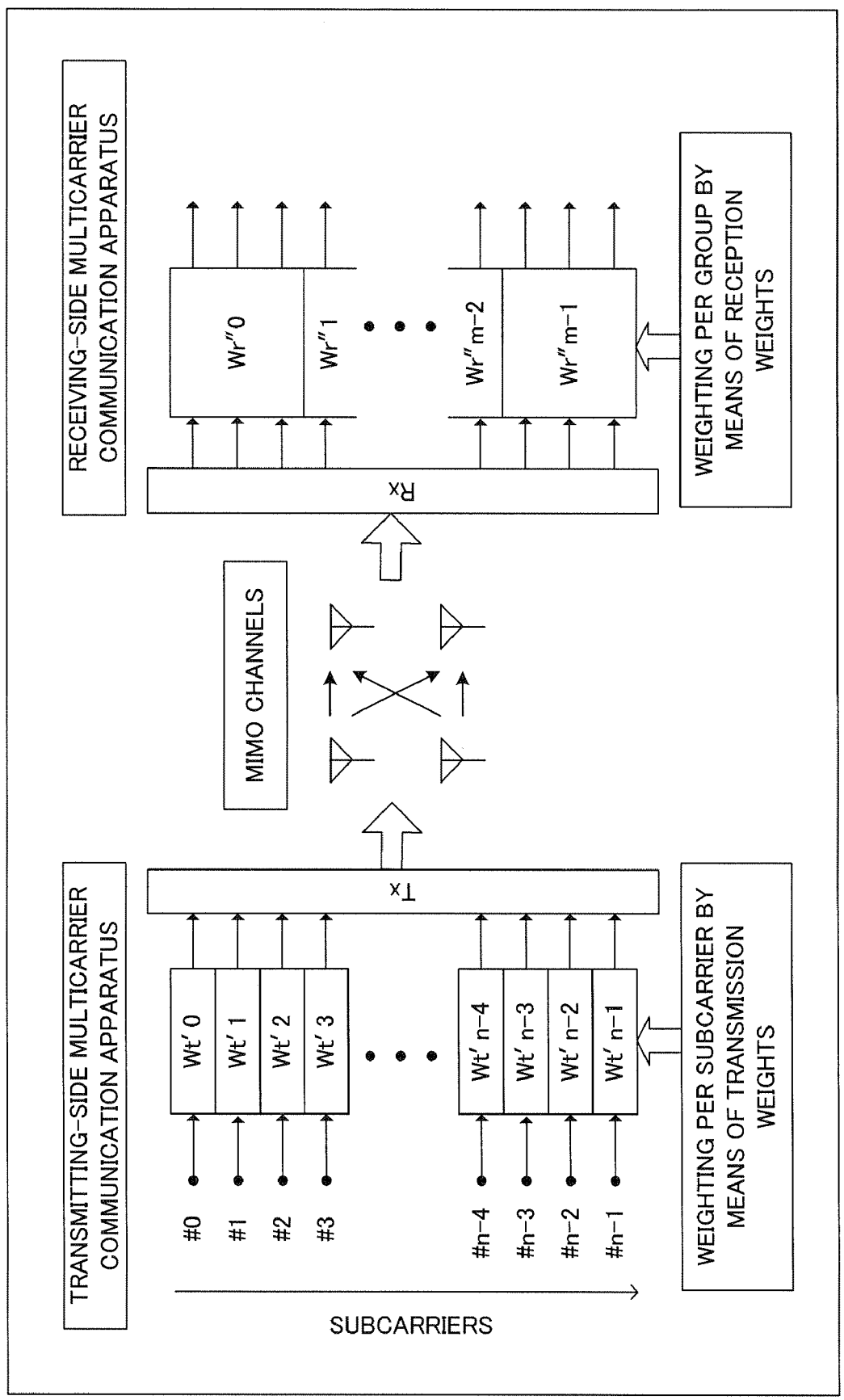
FIG. 3 is a conceptual diagram showing the relationship between transmission weights and reception weights multiplied by a multicarrier signal in multicarrier communication apparatuses according to Embodiment 1.

FIG. 3 is a conceptual diagram showing the relationship between transmission weights $Wt'x$ (where x is an arbitrary natural number) and reception weights $Wr''y$ (where y is an arbitrary natural number smaller than x) multiplied by a multicarrier signal in multicarrier communication apparatuses according to Embodiment 1 of the present invention. As shown in FIG. 3, in this embodiment a transmitting-side multicarrier communication apparatus calculates a transmission weight for each subcarrier and multiplies the corresponding subcarrier by that weight, whereas a receiving-side multicarrier communication apparatus multiplies all subcarriers in one subcarrier group by one reception weight.

Figure 4:
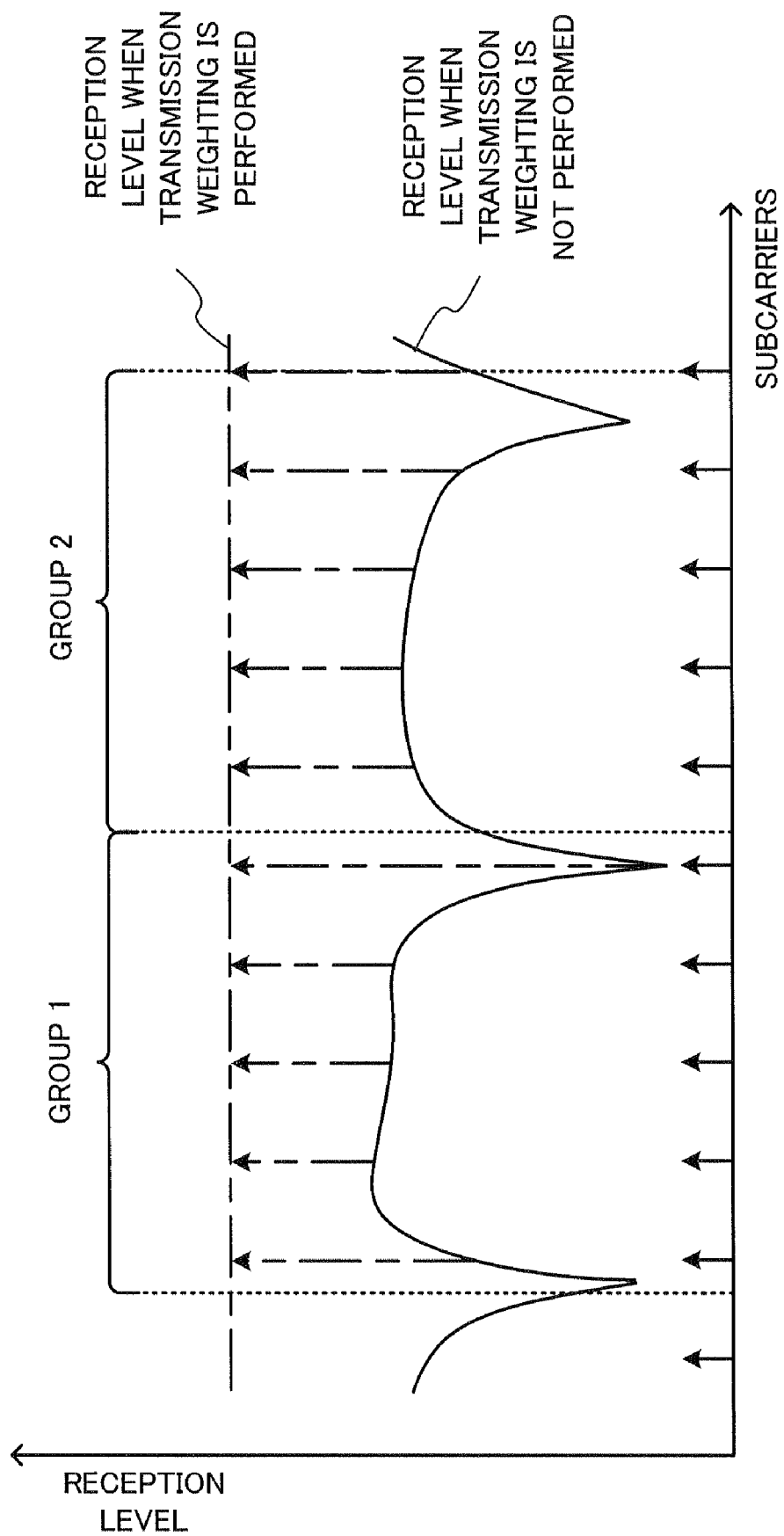
FIG. 4 is a drawing explaining the result of weighting by means of transmission weights according to Embodiment 1.

As shown in FIG. 4, the transmitting-side multicarrier communication apparatus considers the reception conditions per subcarrier—that is, the channel conditions per subcarrier—in the receiving-side multicarrier communication apparatus, and generates a transmission weight to be multiplied by each subcarrier so that the reception levels and phases of subcarriers of a multicarrier signal become uniform in the same subcarrier group after multiplication by the transmission weights. Here, transmission weights and reception weights are coefficients that control amplitude and phase, with complex coefficients being used, for example.

As shown in FIG. 3, in this embodiment the transmitting-side and receiving-side multicarrier communication apparatuses are both equipped with a plurality of antennas, and perform high-speed radio communication using MIMO (Multiple Input Multiple Output) transmission technique. In MIMO transmission, SDM (Space Division Multiplexing) that increases transmission capacity is performed by transmitting different signals from a plurality of antennas at the same time and at the same frequency.

Unexamined Japanese Patent Publication No. 2003-258770 describes a technique whereby, in MIMO transmission in which SDM is performed, when a transmitting-side communication apparatus (not a multicarrier communication apparatus) has ascertained the channel conditions between transmitting and receiving antennas, weighting is performed by multiplying a transmit signal and received signal by weights in both the transmitting-side and receiving-side communication apparatuses.

In the technique in this publication, a weight used for weighting is generated by means of a matrix computation such as eigenvalue decomposition or inverse matrix computation based on channel information comprising the results of channel condition estimation. In this matrix computation for performing weight generation, the amount of computational processing increases to the second power, third power, or higher order according to the number of matrix elements. Therefore, when MIMO transmission technique is applied to multicarrier communication, since the channel conditions differ for each subcarrier of a multicarrier signal between the transmitting and receiving antennas, there are at least as many matrix elements as there are subcarriers, with the result that the amount of computational processing necessary for weight generation is enormous.

Figure 5:
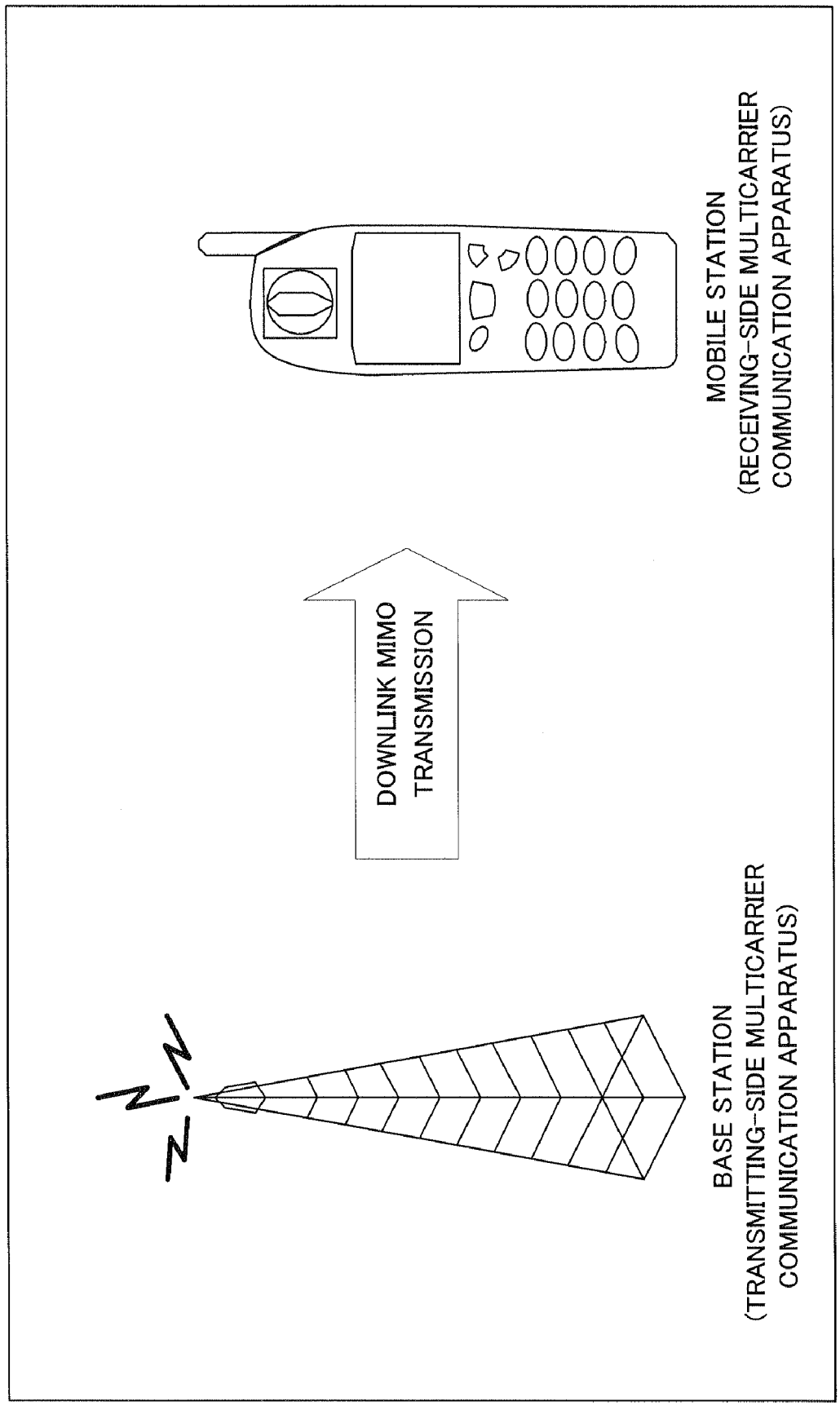
FIG. 5 is a drawing showing the configuration of a mobile radio communication system according to Embodiment 1.

Also, since MIMO transmission technique can achieve a high transmission capacity, its use in multicarrier communication, for example, has been studied, and it may be applied to a downlink from a base station to a mobile station as shown in FIG. 5.

Thus, when MIMO transmission technique is applied to multicarrier communication, it is generally necessary to provide a means of reducing the amount of computational processing in a receiving-side multicarrier communication apparatus so that multicarrier signal reception processing can be performed properly even by a mobile station with low computational processing capability.

In this embodiment, it is assumed that multicarrier communication to which MIMO transmission technique is applied is performed under the following preconditions.

(1) A transmitting-side multicarrier communication apparatus is a base station, and a receiving-side multicarrier communication apparatus is a mobile station.
(2) A multicarrier signal is an OFDM signal.
(3) A transmitting-side multicarrier communication apparatus and a receiving-side multicarrier communication apparatus have both ascertained beforehand the subcarriers that compose a subcarrier group.
(4) Subcarriers that compose a subcarrier group are fixed, and one subcarrier group is composed of a predetermined number of subcarriers of adjacent frequencies.
(5) MIMO transmission is performed by means of the TDD (Time Division Duplex) method.
(6) The total number of subcarriers in an OFDM signal is designated "N," an arbitrary subcarrier number is designated "n," the total number of subcarrier groups in an OFDM signal is designated "M," and an arbitrary subcarrier group number is designated "m."

Figure 6:
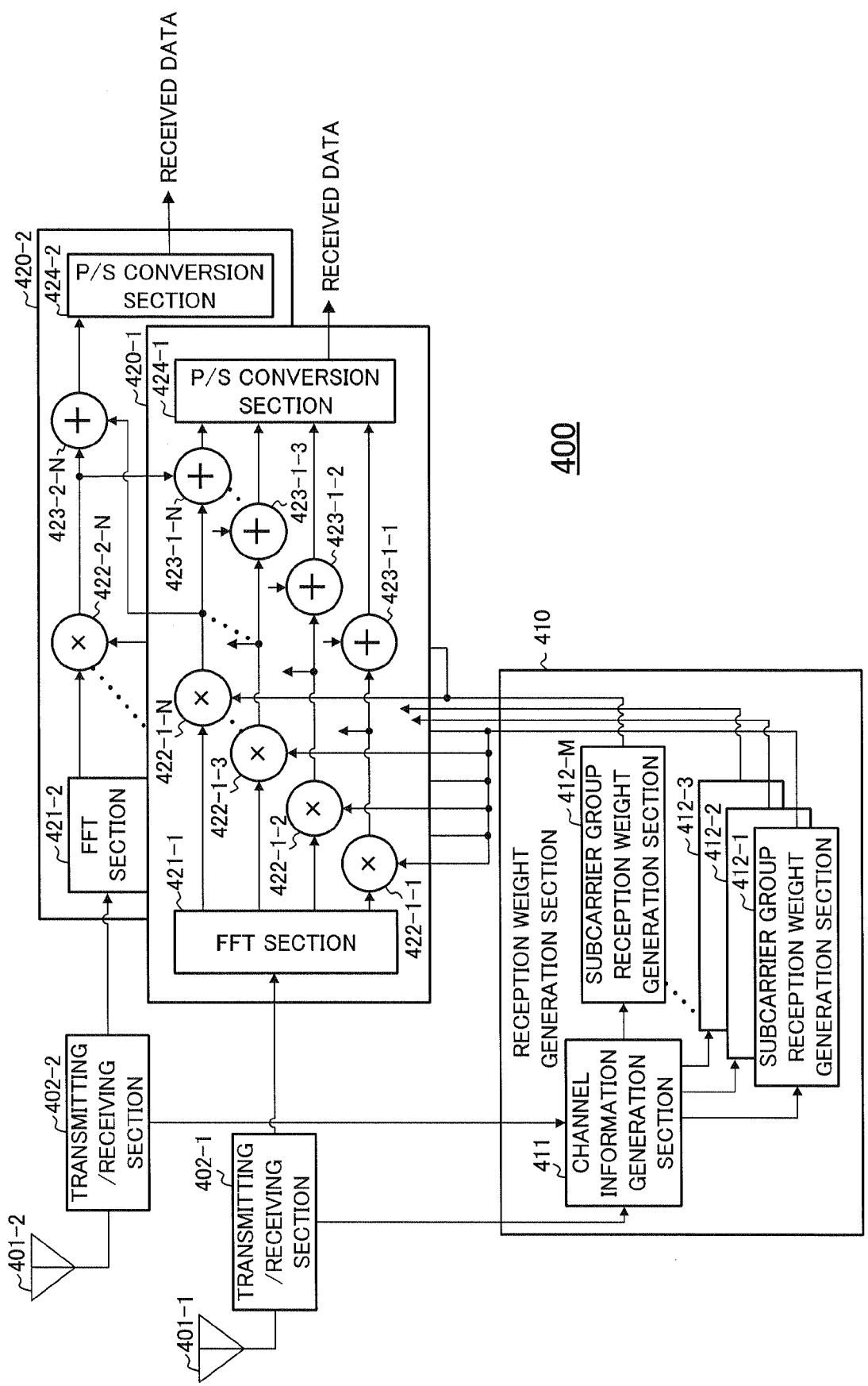
FIG. 6 is a block diagram showing the main configuration of a multicarrier communication apparatus according to Embodiment 1.

FIG. 6 is a block diagram showing the main configuration of a multicarrier communication apparatus 400 according to this embodiment. Multicarrier communication apparatus 400 is a receiving-side multicarrier communication apparatus, and is installed in a mobile station such as a mobile phone, for example. Multicarrier communication apparatus 400 has two antennas 401-1 and 401-2, two transmitting/receiving sections 402-1 and 402-2, a reception weight generation section 410, and two reception weighting sections 420-1 and 420-2. A plurality of configuration elements having the same function in multicarrier communication apparatus 400 are assigned the same reference numerals, and those configuration elements having the same reference numerals are differentiated by a serial number following the reference numerals. In the following description, when a function or operation common to a plurality of configuration elements having the same reference numerals is described, serial numbers are omitted.

Reception weight generation section 410 has a channel information generation section 411 and M subcarrier group reception weight generation sections 412-1 through 412-M. Reception weighting sections 420-1 and 420-2 each have a Fast Fourier Transform (FFT) section 421-1/421-2, N multipliers 422-1-1 through 422-1-N/422-2-1 through 422-2-N (where N>M), N adders 423-1-1 through 423-1-N/423-2-1 through 423-2-N, and a parallel/serial (P/S) conversion section 424-1/424-2.

Transmitting/receiving section 402 receives, via antenna 401, an OFDM signal MIMO-transmitted on a downlink from a multicarrier communication apparatus 500 described later herein, executes predetermined reception processing such as frequency conversion and amplification on that received signal, and then inputs that received signal to FFT section 421 and channel information generation section 411.

Channel information generation section 411 extracts a pilot signal from the received signal input from transmitting/receiving section 402, performs channel estimation for each subcarrier based on the extracted pilot signal and generates channel information per subcarrier, and inputs the generated channel information per subcarrier to subcarrier group reception weight generation section 412.

Subcarrier group reception weight generation section 412 selects the subcarrier closest to the center frequency in the subcarrier group it handles based on the channel information per subcarrier input from channel information generation section 411, and based on a channel estimation value of the selected subcarrier, generates a reception weight by which all subcarriers in that subcarrier group are to be multiplied. Subcarrier group reception weight generation section 412 then inputs the generated reception weight to the corresponding multiplier 422. The way in which subcarrier group reception weight generation section 412 generates a reception weight will be described later herein.

FFT section 421 converts the received signal input from transmitting/receiving section 402 from a serial signal to a parallel signal, separates the OFDM signal into subcarriers by performing Fast Fourier Transform processing, and then inputs that parallel signal to multiplier 422.

Multiplier 422 multiplies the parallel signal per subcarrier input from FFT section 421 by the reception weight input from subcarrier group reception weight generation section 412. Then multiplier 422-1 inputs the parallel signal multiplied by the reception weight to adder 423-1, and also to adder 423-2 that handles the same subcarrier as this adder 423-1. That is to say, multipliers 422 are the main configuration elements of the weighting section in multicarrier communication apparatus 400.

Adder 423-1 adds together the received signal input from multiplier 422-1 and the parallel signal input from multiplier 422-2 that handles the same subcarrier as this multiplier 422-1, and inputs the addition result to P/S conversion section 424-1. Similarly, adder 423-2 adds together the parallel signal input from multiplier 422-2 and the parallel signal input from multiplier 422-1 that handles the same subcarrier as this multiplier 422-2, and inputs the addition result to P/S conversion section 424-2.

P/S conversion section 424 generates receive data by converting the addition result input from adder 423 from a parallel signal to a serial signal, and inputs the generated receive data to a control section or the like (not shown).

Figure 7:
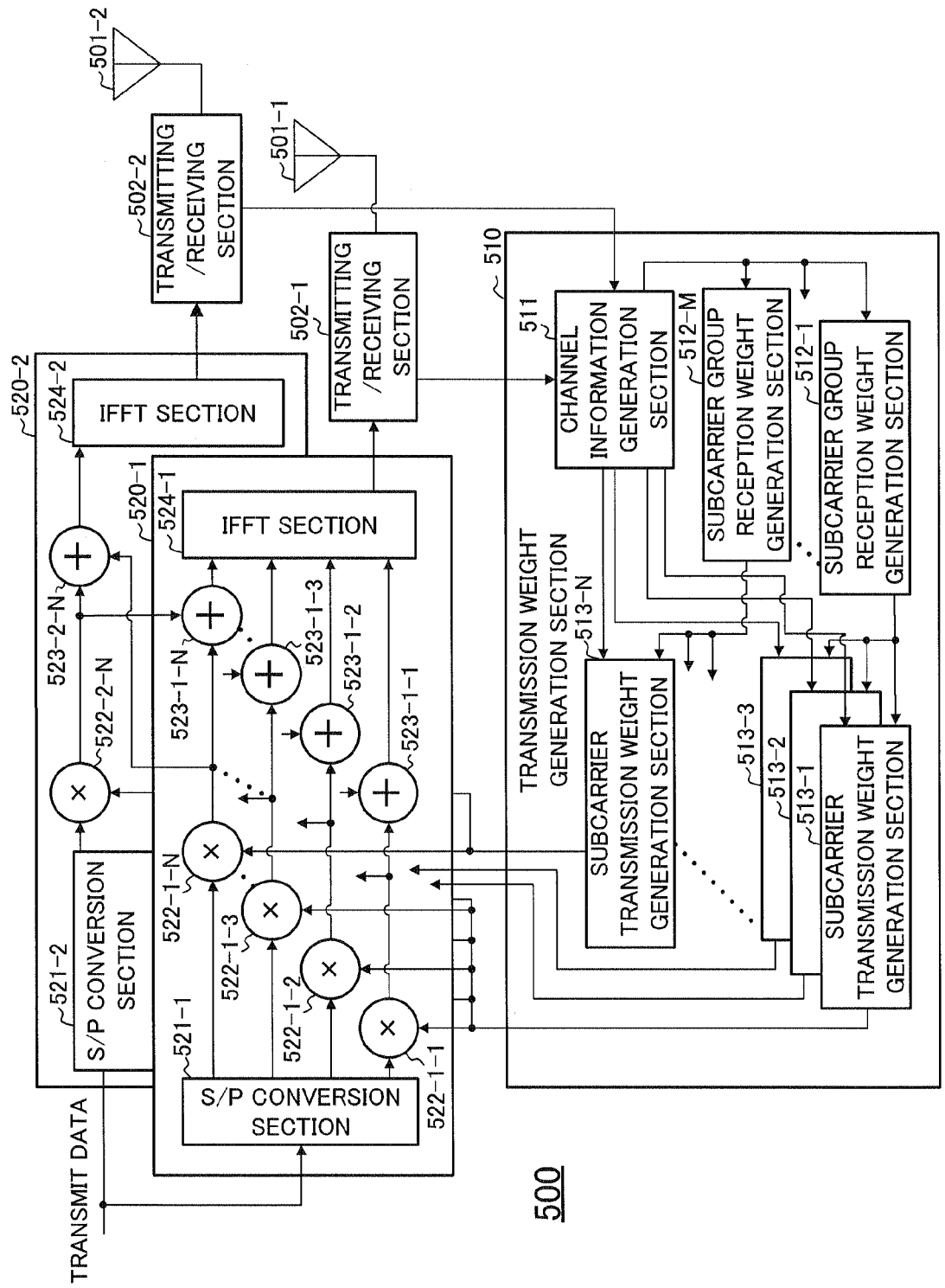
FIG. 7 is a block diagram showing the main configuration of a multicarrier communication apparatus according to Embodiment 1.

FIG. 7 is a block diagram showing the main configuration of a multicarrier communication apparatus 500 according to this embodiment. Multicarrier communication apparatus 500 is a transmitting-side multicarrier communication apparatus, and is installed in a base station in a mobile radio communication system, for example. Multicarrier communication apparatus 500 has two antennas 501-1 and 501-2, two transmitting/receiving sections 502-1 and 502-2, a transmission weight generation section 510, and two transmission weighting sections 520-1 and 520-2. A plurality of configuration elements having the same function in multicarrier communication apparatus 500 are assigned the same reference numerals, and those configuration elements having the same reference numerals are differentiated by a serial number following the reference numerals.

Transmission weight generation section 510 has a channel information generation section 511, M subcarrier group reception weight generation sections 512-1 through 512-M, and N subcarrier transmission weight generation sections 513-1 through 513-N.

Transmission weighting sections 520-1 and 520-2 each have a serial/parallel (S/P) conversion section 521-1/521-2, N multipliers 522-1-1 through 522-1-N/522-2-1 through 522-2-N, N adders 523-1-1 through 523-1-N/523-2-1 through 523-2-N, and an Inverse Fast Fourier Transform (IFFT) section 524-1/524-2.

Transmitting/receiving section 502 receives, via antenna 501, an OFDM signal MIMO-transmitted on an uplink from multicarrier communication apparatus 400, executes predetermined reception processing such as frequency conversion and amplification on that received signal, and then inputs that received signal to channel information generation section 511. Also, transmitting/receiving section 502 performs predetermined transmission processing on a transmit signal (OFDM signal) input from IFFT section 524 described later herein, and then performs MIMO transmission of this OFDM signal to multicarrier communication apparatus 400 on a downlink via antenna 501.

Channel information generation section 511 extracts a pilot signal from the received signal input from transmitting/receiving section 502, performs channel estimation for each subcarrier based on the extracted pilot signal and generates channel information per subcarrier, and inputs the generated channel information per subcarrier to subcarrier group reception weight generation section 512 and subcarrier transmission weight generation section 513.

Subcarrier group reception weight generation section 512 functions similarly to subcarrier group reception weight generation section 412, and selects the subcarrier closest to the center frequency in the subcarrier group it handles based on the channel information per subcarrier input from channel information generation section 511, and based on the channel information (channel estimation value) of the selected subcarrier, generates a reception weight for that subcarrier group. Subcarrier group reception weight generation section 512 then inputs the generated reception weight to subcarrier transmission weight generation section 513.

Subcarrier transmission weight generation section 513 generates a transmission weight per subcarrier based on channel information per subcarrier input from channel information generation section 511 and a reception weight per subcarrier group input from subcarrier group reception weight generation section 512. Subcarrier transmission weight generation section 513 then inputs the generated transmission weight per subcarrier to the corresponding multiplier 522. The way in which subcarrier transmission weight generation section 513 generates a transmission weight will be described later herein.

S/P conversion section 521 separates transmit data input from a control section or the like (not shown) into signals per subcarrier by converting the transmit data from a serial signal to a parallel signal, and inputs that parallel signal to multiplier 522.

Multiplier 522 multiplies the parallel signal input from S/P conversion section 521 by the transmission weight input from subcarrier transmission weight generation section 513. Then multiplier 522-1 inputs the parallel signal multiplied by that transmission weight to adder 523-1, and also to adder 523-2 that handles the same subcarrier as this adder 523-1. That is to say, multipliers 522 are the main configuration elements of the weighting section in multicarrier communication apparatus 500.

Adder 523-1 adds together the parallel signal input from multiplier 522-1 and the parallel signal input from multiplier 522-2 that handles the same subcarrier as this multiplier 522-1, and inputs the addition result to IFFT section 524-1. Similarly, adder 523-2 adds together the parallel signal input from multiplier 522-2 and the parallel signal input from multiplier 522-1 that handles the same subcarrier as this multiplier 522-2, and inputs the addition result to IFFT section 524-2.

IFFT section 524 performs Inverse Fast Fourier Transform processing of the addition result input from adder 523, generates an OFDM signal by converting the post-conversion signal from a parallel signal to a serial signal, and inputs the generated OFDM signal to transmitting/receiving section 502.

Next, the operation of multicarrier communication apparatus 400 will be described using FIG. 8, and the operation of multicarrier communication apparatus 500 will be described using FIG. 9.

Figure 8:
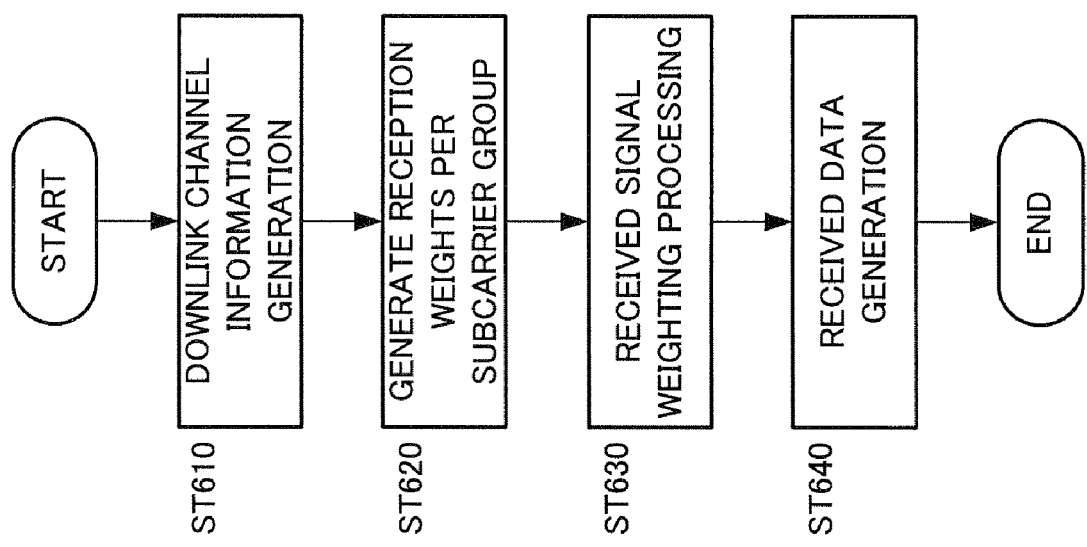
FIG. 8 is a flowchart explaining the operation of a multicarrier communication apparatus according to Embodiment 1.

In FIG. 8, in step ST610 channel information generation section 411 extracts a pilot signal from a downlink received signal, and generates channel information per subcarrier indicating the channel conditions of each downlink subcarrier by performing channel estimation per subcarrier using that pilot signal.

Next, in step ST620, subcarrier group reception weight generation section 412 generates a reception weight per subcarrier group based on channel information per subcarrier generated in step ST610. Here, if the number of the subcarrier closest to the center frequency in subcarrier group m is designated p, reception weight $Wrx_m$ is calculated as a Zero Forcing weight by means of Equation 1 using subcarrier p channel information $H_p$.

$$Wrx_m = H_p^+ \qquad \text{(Equation 1)}$$

The plus sign "+" in Equation 1 indicates a Moore-Penrose generalized inverse matrix operation.

Then, in step ST630, multiplier 422 performs received signal weighting by multiplying the reception weight per subcarrier group generated in step ST620 by all subcarriers in that subcarrier group.

Next, in step ST640, adder 423 and P/S conversion section 424 add the received signals weighted in step ST630, and generate receive data by performing FFT processing.

Figure 9:
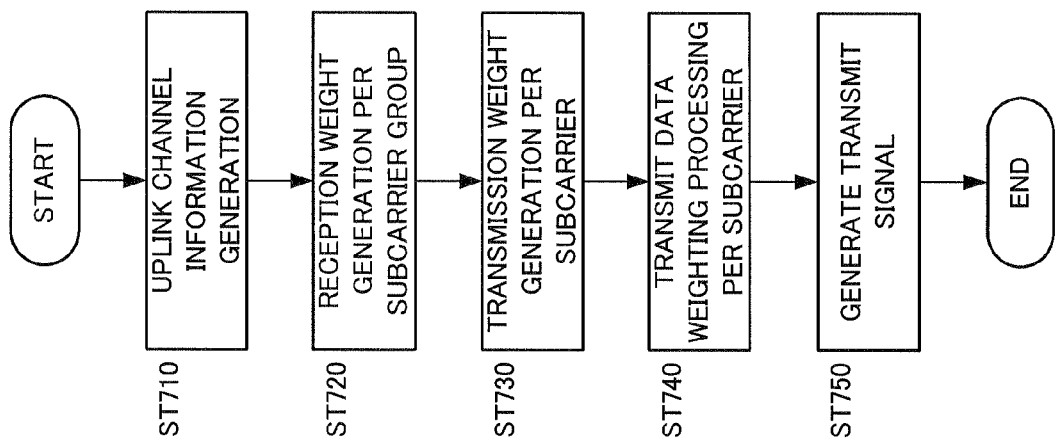
FIG. 9 is a flowchart explaining the operation of a multicarrier communication apparatus according to Embodiment 1.

Meanwhile, in FIG. 9, in step ST710 channel information generation section 511 extracts a pilot signal from an uplink received signal, and generates channel information per subcarrier indicating the uplink channel conditions by performing channel estimation based on that pilot signal.

Then, in step ST720, subcarrier group reception weight generation section 512 generates a reception weight per subcarrier group using, for example, Equation 1 in the same way as in step ST620, based on the channel information per subcarrier generated in step ST710.

Here, in order to improve OFDM signal reception characteristics in multicarrier communication apparatus 400, it is necessary for subcarrier group reception weight generation section 512 to generate the same reception weights as generated by subcarrier group reception weight generation section 412, but in this embodiment, since an OFDM signal is transmitted and received by means of the TDD method, subcarrier group reception weight generation section 512 can use channel information per subcarrier generated based on a pilot signal in an uplink as channel information per subcarrier generated based on a pilot signal in a downlink. This is because the time difference between slots used by the downlink and uplink is very small, and the frequency band is the same, so that channel reciprocity of the uplink and downlink is admissible.

Next, in step ST730, subcarrier transmission weight generation section 513 generates a transmission weight per subcarrier based on channel information per subcarrier in the uplink generated in step ST710 and a reception weight per subcarrier group generated in step ST720. Here, transmission weight $Wtx_n$ of subcarrier n in subcarrier group m is calculated by means of Equation 2 using reception weight $Wrx_m$ from Equation 1 and subcarrier n channel information $H_n$.

$$Wtx_n = (Wrx_m \cdot H_n)^+ \qquad \text{(Equation 2)}$$

Then, in step ST740, multiplier 522 multiplies a transmission weight per subcarrier generated in step ST730 by the corresponding subcarrier (parallel signal) to perform weighting of that parallel signal.

Next, in step ST750, adder 523 and IFFT section 524 add the parallel signals weighted in step ST740, and generate a transmit signal (OFDM signal) by performing IFFT processing.

Thus, according to this embodiment, multicarrier communication apparatus 500 that transmits an OFDM signal ascertains the channel conditions per subcarrier (downlink channel conditions) in multicarrier communication apparatus 400 that receives that OFDM signal, and adjusts the transmission weight by which each subcarrier is multiplied so that the reception levels and phases of all subcarriers in a subcarrier group of that OFDM signal become uniform, thereby enabling the reception characteristics of this OFDM signal to be improved while reducing the amount of computational processing for reception weight generation in multicarrier communication apparatus 400.

Also, according to this embodiment, the amount of computational processing for reception weight general in multicarrier communication apparatus 400 is effectively reduced, enabling the scale and power consumption of the relevant circuit to be decreased. In particular, since multicarrier communication apparatus 400 is installed in a mobile station such as a mobile phone, the commercial value is significantly improved by reducing the circuit scale and power consumption.

Moreover, according to this embodiment, since multicarrier communication apparatus 500 itself generates reception weights necessary for transmission weight generation based on a pilot signal transmitted from multicarrier communication apparatus 400, it is not necessary for reception weights themselves to be transmitted from multicarrier communication apparatus 400 by means of a feedback channel or the like, enabling the data transmission speed on the uplink to be increased easily.

Multicarrier communication apparatuses 400 and 500 according to this embodiment may also be modified and adapted as described below.

In this embodiment a case has been described in which multicarrier communication apparatus 500 itself generates reception weights necessary for transmission weight generation, but the present invention is not limited to this case, and, for example, reception weights generated by multicarrier communication apparatus 400 may be reported to multicarrier communication apparatus 500 by means of a feedback channel or the like. If this is done, subcarrier group reception weight generation section 512 can be eliminated from multicarrier communication apparatus 500, enabling the configuration of multicarrier communication apparatus 500 to be simplified.

Also, in this embodiment a case has been described in which multicarrier communication apparatus 400 generates reception weights based on a pilot signal from multicarrier communication apparatus 500, but the present invention is not limited to this case, and, for example, multicarrier communication apparatus 500 may multiply channel information per subcarrier generated by channel information generation section 511 by a transmission weight, and perform MIMO transmission of that channel information per subcarrier to multicarrier communication apparatus 400. If this is done, multicarrier communication apparatus 400 can generate reception weights based on channel information per subcarrier generated by channel information generation section 511 without a pilot signal being transmitted from multicarrier communication apparatus 500. Therefore, since a pilot signal need no longer be transmitted from multicarrier communication apparatus 500 to multicarrier communication apparatus 400, the transmission capacity on the downlink can be further increased.

Moreover, in this embodiment a case has been described in which subcarrier group reception weight generation section 412 or subcarrier group reception weight generation section 512 generates a Zero Forcing weight as a reception weight, but the present invention is not limited to this case, and, for example, subcarrier group reception weight generation section 412 or subcarrier group reception weight generation section 512 may generate an MMSE (minimum mean squared error) weight or eigenvector used in eigen-beam transmission as a reception weight.

Furthermore, in this embodiment a case has been described in which subcarrier group reception weight generation section 412 or subcarrier group reception weight generation section 512 generates a reception weight based on the channel estimation value of the subcarrier closest to the center frequency in a subcarrier group, but the present invention is not limited to this case, and, for example, subcarrier group reception weight generation section 412 or subcarrier group reception weight generation section 512 may generate a reception weight based on the channel estimation value of the subcarrier with the highest received power in a subcarrier group. If this is done, the precision of channel information per subcarrier detection can be effectively increased, enabling the reception characteristics of an OFDM signal in multicarrier communication apparatus 400 to be effectively improved. Also, in this adaptation example, the channel estimation value of the subcarrier with the highest Signal-to-Interference power Ratio (SIR) or Signal-to-Noise Ratio (SNR) in a subcarrier group may be used instead of the channel estimation value of the subcarrier with the highest received power.

Moreover, subcarrier group reception weight generation section 412 or subcarrier group reception weight generation section 512 may, for example, generate a reception weight per subcarrier based on the average of the channel estimation values of all the subcarriers in a subcarrier group. If this is done, the reception characteristics of an OFDM signal in multicarrier communication apparatus 400 can be stabilized even when there is deviation in the channel estimation values of subcarriers in a subcarrier group.

Furthermore, in this adaptation example, subcarrier group reception weight generation section 412 or subcarrier group reception weight generation section 512 may use the average of the channel estimation values of the subcarrier with the highest frequency and the subcarrier with the lowest frequency in a subcarrier group instead of the average of the channel estimation values of all the subcarriers in a subcarrier group. If this is done, since the fluctuation of subcarrier channel conditions at either end of a subcarrier group is stochastically uniform, the reception characteristics of an OFDM signal in multicarrier communication apparatus 400 can be expected to be stabilized.

Also, in this adaptation example, subcarrier group reception weight generation section 412 or subcarrier group reception weight generation section 512 may use the average of the channel estimation values of subcarriers of a predetermined interval instead of the average of the channel estimation values of all the subcarriers in a subcarrier group. If this is done, subcarrier group reception weight generation section 412 or subcarrier group reception weight generation section 512 can effectively reduce the amount of computational processing necessary for reception weight per subcarrier group generation.

In this embodiment, a case has been described in which complex coefficients are used as transmission and reception weights, but the present invention is not limited to this case, and, for example, real coefficients representing only amplitude information or phase information may be used. If this is done, when either amplitude fluctuation or phase fluctuation is more dominant within a subcarrier group, a similar effect can be obtained by generating a transmission weight only for that dominant fluctuation and multiplying a transmission weight generated on the transmitting side.

Also, in this embodiment a case has been described in which multicarrier communication apparatus 400 and multicarrier communication apparatus 500 perform MIMO transmission of an OFDM signal by means of the TDD method, but the present invention is not limited to this case, and, for example, multicarrier communication apparatus 400 and multicarrier communication apparatus 500 may perform MIMO transmission of an OFDM signal by means of the FDD (Frequency Division Duplex) method. When MIMO transmission of an OFDM signal is performed by means of the FDD method, different frequency bands are used on the uplink and downlink, so that channel reciprocity is no longer possible between the uplink and downlink, and therefore subcarrier group reception weight generation section 512 can no longer generate reception weights based on channel information per subcarrier generated by channel information generation section 511. Thus, when MIMO transmission of an OFDM signal is performed by means of the FDD method, it is necessary for multicarrier communication apparatus 400 to transmit reception weights generated by subcarrier group reception weight generation section 412 to multicarrier communication apparatus 500 using a feedback channel or the like.

Furthermore, when sufficient transmission capacity can be secured on a feedback channel, channel information per subcarrier generated by channel information generation section 411 may be transmitted as information transmitted to multicarrier communication apparatus 500 using the feedback channel.

Also, in this embodiment a case has been described in which multicarrier communication apparatus 500 that transmits an OFDM signal is a base station and multicarrier communication apparatus 400 that receives that OFDM signal is a mobile station, but the present invention is not limited to this case, and, for example, multicarrier communication apparatus 500 that transmits an OFDM signal may be a mobile station, and multicarrier communication apparatus 400 that receives that OFDM signal may be a base station.

Embodiment 2

In Embodiment 2 of the present invention, the correlation of channel conditions between subcarriers in Embodiment 1 is calculated, and subcarrier groups are determined based on that correlation value. That is to say, while a case in which subcarriers composing a subcarrier group are fixed has been described in Embodiment 1, in this embodiment subcarriers composing a subcarrier group vary adaptively according to the correlation between subcarriers. In other words, in Embodiment 1, when there is major temporal fluctuation of channel conditions within the band of one subcarrier group, since subcarriers are fixed there is a risk that subcarriers composing that group will be multiplied by a transmission weight that does not reflect the actual channel conditions.

Thus, in this embodiment, by calculating inter-subcarrier correlation and grouping together subcarriers for which that correlation value is high, degradation of OFDM signal reception characteristics in a receiving-side multicarrier communication apparatus is suppressed even if there is major temporal fluctuation of channel conditions in a subcarrier group.

Figure 10:
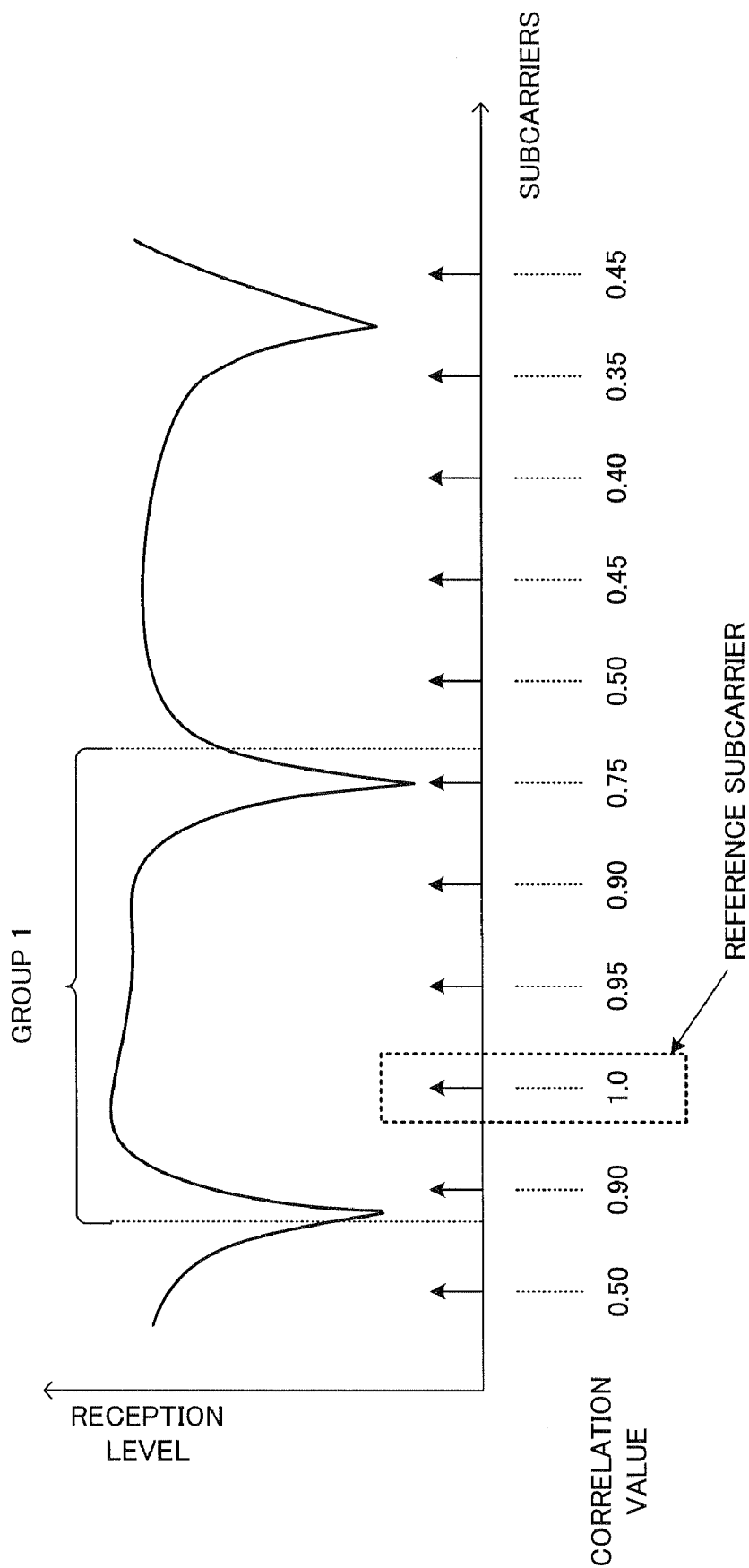
FIG. 10 is a drawing showing a first example of determining a subcarrier group based on correlation between subcarriers according to Embodiment 2.

FIG. 10 shows a first example of determining a subcarrier group based on correlation between subcarriers. In FIG. 10, an arbitrary subcarrier is decided upon as a reference subcarrier, and correlation values between this reference subcarrier and other subcarriers are calculated. The inter-subcarrier correlation value calculation method will be described later herein. Then, in the first example shown in FIG. 10, the calculated correlation values are compared with a given threshold value, such as 0.7, for example, and subcarrier group 1 is determined by collecting together subcarriers whose correlation value is greater than or equal to 0.7. Therefore, in the first example shown in FIG. 10, the number of subcarriers composing a subcarrier group varies according to the distribution of inter-subcarrier correlation values—that is, according to the channel conditions per subcarrier.

Figure 11:
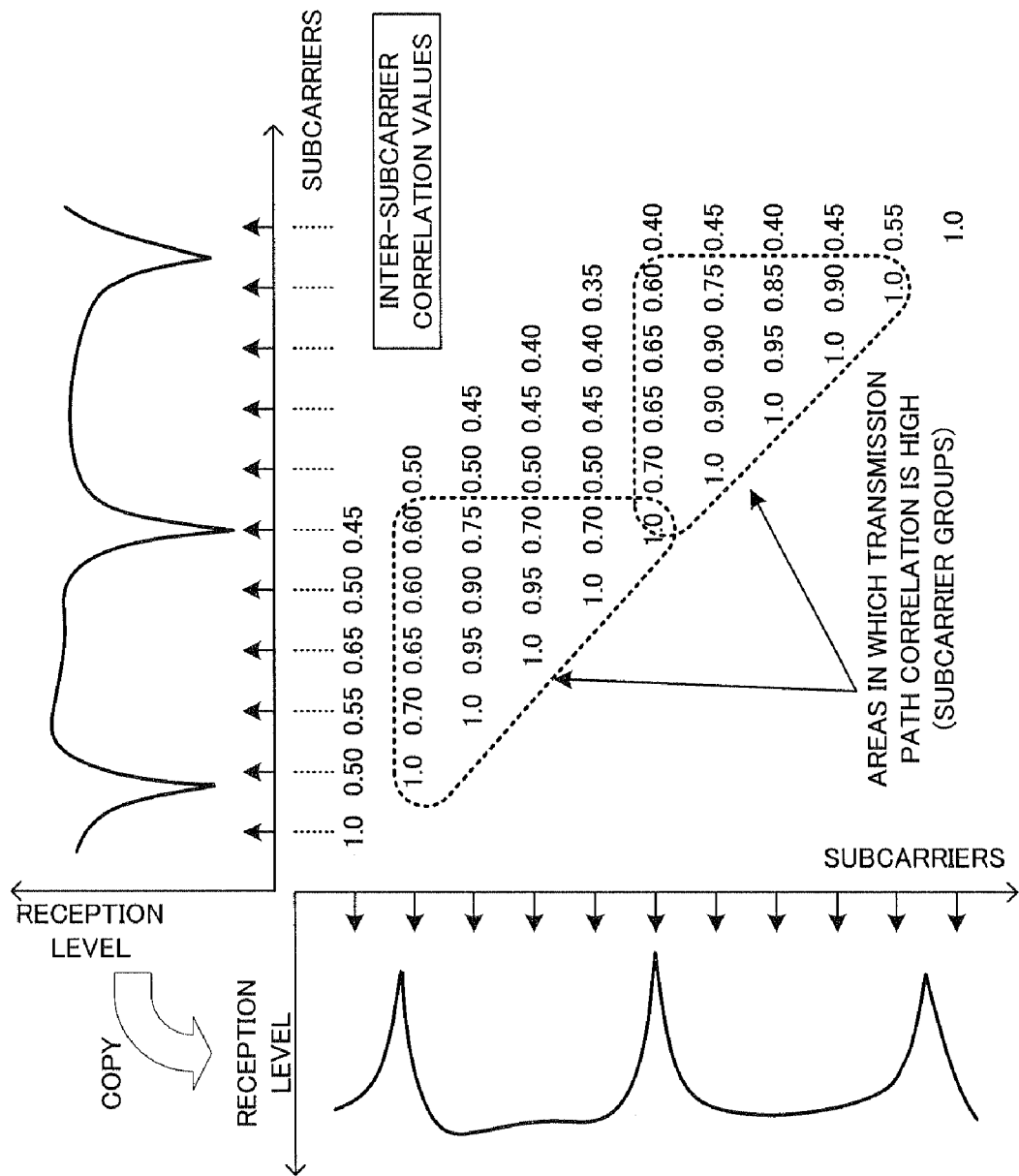
FIG. 11 is a drawing showing a second example of determining a subcarrier group based on correlation between subcarriers according to Embodiment 2.

FIG. 11 shows a second example of determining a subcarrier group based on correlation between subcarriers. In the second example shown in FIG. 11, all the correlation values between subcarriers present within a predetermined bandwidth are calculated, the calculated inter-subcarrier correlation values are made into a matrix, a band in which inter-subcarrier correlation values are high is detected based on that matrix, and subcarriers in that band with high inter-subcarrier correlation values are collected together to form a group. In the second example shown in FIG. 11, when this grouping is performed, the total number of subcarrier groups is determined beforehand, and the number of subcarriers composing one subcarrier group is varied.

Figure 12:
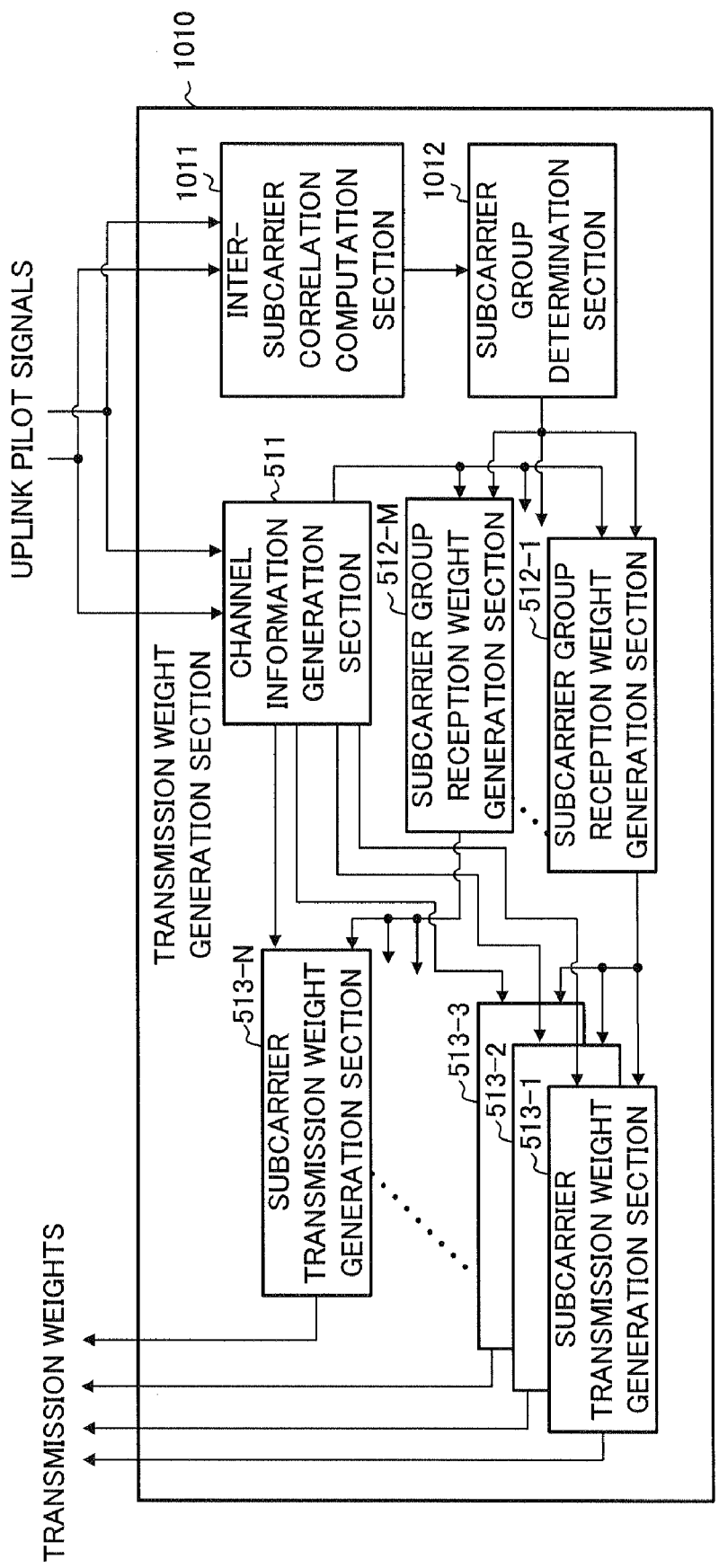
FIG. 12 is a block diagram showing the configuration of a transmission weight generation section provided in a multicarrier communication apparatus according to Embodiment 2.

FIG. 12 is a block diagram showing the configuration of a transmission weight generation section 1010 provided in a multicarrier communication apparatus according to this embodiment. Transmission weight generation section 1010 is a configuration element provided instead of transmission weight generation section 510 in multicarrier communication apparatus 500. Transmission weight generation section 1010 has an inter-subcarrier correlation computation section 1011 and subcarrier group determination section 1012 in addition to the configuration elements of transmission weight generation section 510. Therefore, since transmission weight generation section 1010 has all the configuration elements provided in transmission weight generation section 510, a description of such identical configuration elements is omitted in this embodiment to avoid duplication.

Inter-subcarrier correlation computation section 1011 performs channel estimation for all subcarriers in an OFDM signal based on an uplink pilot signal input from transmitting/receiving section 502, and calculates inter-subcarrier correlation values using those channel estimation values. Then inter-subcarrier correlation computation section 1011 inputs the calculated inter-subcarrier correlation values to subcarrier group determination section 1012.

Based on the inter-subcarrier correlation values input from inter-subcarrier correlation computation section 1011, subcarrier group determination section 1012 determines subcarrier groups as illustrated by the first example shown in FIG. 10 or the second example shown in FIG. 11. Then subcarrier group determination section 1012 reports information on the determined subcarrier groups to subcarrier group reception weight generation section 512.

Figure 13:
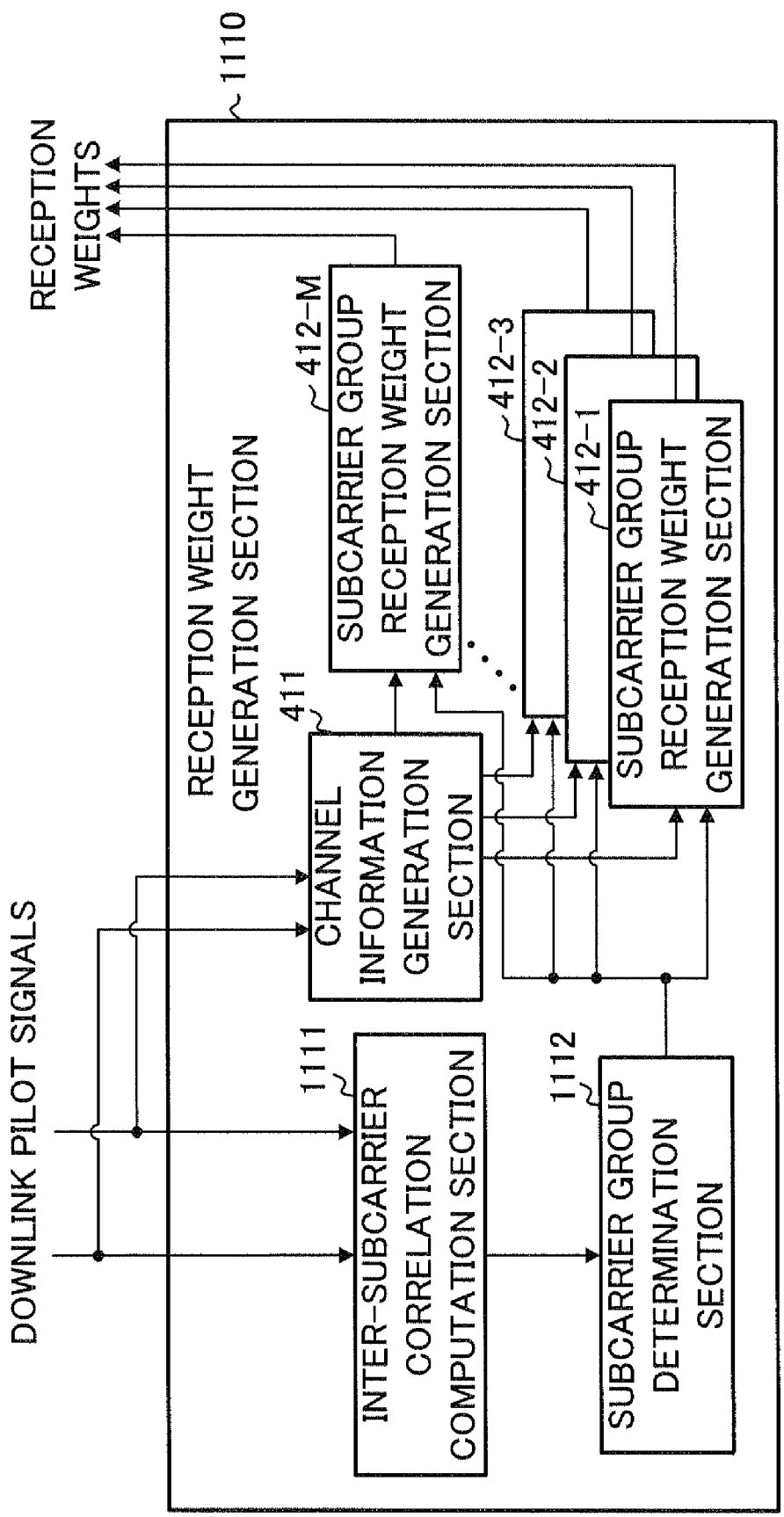
FIG. 13 is a block diagram showing the configuration of a reception weight generation section provided in a multicarrier communication apparatus according to Embodiment 2.

FIG. 13 is a block diagram showing the configuration of a reception weight generation section 1110 provided in a multicarrier communication apparatus according to this embodiment. Reception weight generation section 1110 is a configuration element provided instead of reception weight generation section 410 in multicarrier communication apparatus 400. Reception weight generation section 1110 has an inter-subcarrier correlation computation section 1111 and subcarrier group determination section 1112 in addition to the configuration elements of reception weight generation section 410. Therefore, since reception weight generation section 1110 has all the configuration elements provided in reception weight generation section 410, a description of such identical configuration elements is omitted in this embodiment to avoid duplication.

Inter-subcarrier correlation computation section 1111 performs channel estimation for all subcarriers in an OFDM signal based on a downlink pilot signal input from transmitting/receiving section 402, and calculates inter-subcarrier correlation values using those channel estimation values. Then inter-subcarrier correlation computation section 1111 inputs the calculated inter-subcarrier correlation values to subcarrier group determination section 1112.

Based on the inter-subcarrier correlation values input from inter-subcarrier correlation computation section 1111, subcarrier group determination section 1112 determines subcarrier groups as illustrated by the first example shown in FIG. 10 or the second example shown in FIG. 11. Then subcarrier group determination section 1112 reports information on the determined subcarrier groups to subcarrier group reception weight generation section 412.

Next, the operation of multicarrier communication apparatus 400 according to this embodiment will be described using FIG. 14, and the operation of multicarrier communication apparatus 500 according to this embodiment will be described using FIG. 15.

Figure 14:
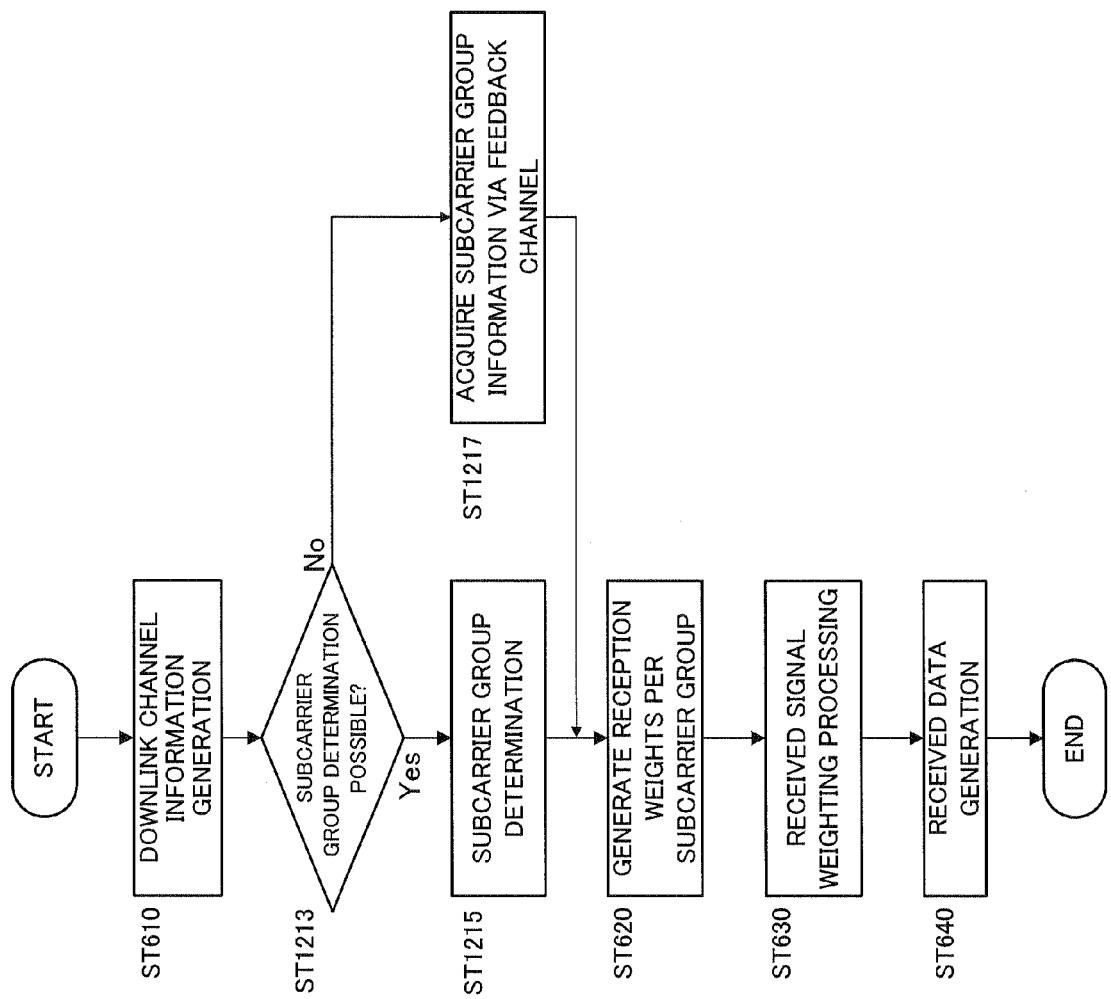
FIG. 14 is a flowchart explaining the operation of a multicarrier communication apparatus according to Embodiment 2.

In the flowchart shown in FIG. 14, a step ST1213, step ST1215, and step ST1217 relating to subcarrier group determination are executed between step ST610 and step ST620 in FIG. 8. To avoid duplication, only these steps relating to subcarrier group determination will be described below.

In FIG. 14, in step ST1213 reception weight generation section 1110 determines the subcarrier group determination method—either a method whereby multicarrier communication apparatus 400 itself determines subcarrier groups, or a method whereby subcarrier groups determined by multicarrier communication apparatus 500 are ascertained and used—based on a pilot signal in the downlink. Then, if inter-subcarrier correlation computation section 1111 determines in step ST1213 that the method is that whereby multicarrier communication apparatus 400 itself determines subcarrier groups, step ST1215 is executed after step ST1213, and if, on the other hand, inter-subcarrier correlation computation section 1111 determines that the method is that whereby subcarrier groups determined by multicarrier communication apparatus 500 are ascertained and used, step ST1217 is executed after step ST1213.

In step ST1215, inter-subcarrier correlation computation section 1111 calculates inter-subcarrier correlation values based on downlink channel information per subcarrier generated in step ST610. Here, if channel information for the j'th antenna for subcarrier n is designated $h_{j(n)}$, correlation value $\rho_{j\,(n,n+1)}$ between subcarrier n and subcarrier (n+1) is calculated by means of Equation 3 below.

$$\rho_{j(n,n+1)} = \frac{|h_{j,(n)}^H \cdot h_{j(n+1)}|}{\sqrt{|h_{j(n)}|^2}\sqrt{|h_{j(n+1)}|^2}} \quad \text{(Equation 3)}$$

Here, superscript "H" of channel information h indicates a transposed conjugate. Inter-subcarrier correlation computation section 1111 then calculates, by means of averaging, for example, inter-subcarrier correlation value $\rho_{(n,n+1)}$ for inter-subcarrier correlation values $\rho_{j(n,n+1)}$ calculated in the same way for the other antenna. Then, in step ST1215, subcarrier group determination section 1112 determines subcarrier groups based on inter-subcarrier correlation values $\rho_{(n,n+1)}$ calculated by inter-subcarrier correlation computation section 1111.

On the other hand, in step ST1217, inter-subcarrier correlation computation section 1111 acquires information on subcarrier groups determined by multicarrier communication apparatus 500 transmitted by means of a feedback channel or the like, and reports the acquired subcarrier group information to subcarrier group reception weight generation section 412 via subcarrier group determination section 1112.

Figure 15:
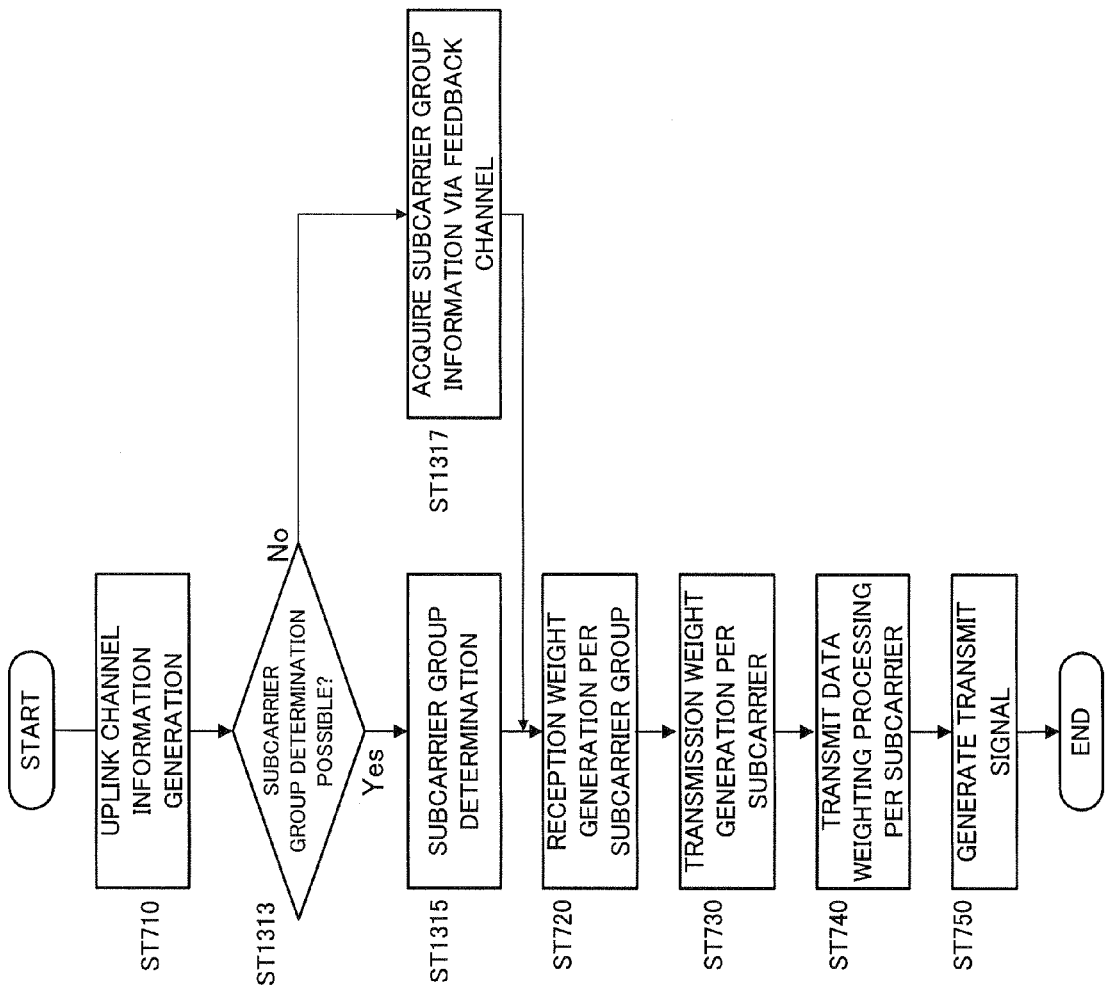
FIG. 15 is a flowchart explaining the operation of a multicarrier communication apparatus according to Embodiment 2.

In the flowchart shown in FIG. 15, a step ST1313, step ST1315, and step ST1317 relating to subcarrier group determination are executed between step ST710 and step ST720 in FIG. 9. To avoid duplication, only these steps relating to subcarrier group determination will be described below.

In FIG. 15, in step ST1313 inter-subcarrier correlation computation section 1011 determines the subcarrier group determination method—either a method whereby multicarrier communication apparatus 500 itself determines subcarrier groups, or a method whereby subcarrier groups determined by multicarrier communication apparatus 400 are ascertained and used—based on a pilot signal in the uplink. Then, if inter-subcarrier correlation computation section 1011 determines in step ST1313 that the method is that whereby multicarrier communication apparatus 500 itself determines subcarrier groups, step ST1315 is executed after step ST1313, and if, on the other hand, inter-subcarrier correlation computation section 1011 determines that the method is that whereby subcarrier groups determined by multicarrier communication apparatus 400 are ascertained and used, step ST1317 is executed after step ST1313.

In step ST1315, inter-subcarrier correlation computation section 1011 calculates inter-subcarrier correlation values $\rho_{(n,n+1)}$ in the same way as in step ST1215, based on uplink channel information per subcarrier generated in step ST710. Then, in step ST1315, subcarrier group determination section 1012 determines subcarrier groups based on inter-subcarrier correlation values $\rho_{(n\,n+1)}$ calculated by inter-subcarrier correlation computation section 1011.

On the other hand, in step ST1317, inter-subcarrier correlation computation section 1011 acquires information on subcarrier groups determined by multicarrier communication apparatus 400 transmitted by means of a feedback channel or the like, and reports the acquired subcarrier group information to subcarrier group reception weight generation section 512 via subcarrier group determination section 1012.

Thus, according to this embodiment, subcarriers composing a subcarrier group are determined adaptively according to inter-subcarrier correlation values calculated based on channel estimation values per subcarrier, enabling subcarriers whose inter-subcarrier correlation values are high to be grouped together, as a result of which the reception characteristics of an OFDM signal in multicarrier communication apparatus 400 can be improved even when there is major temporal fluctuation of channel conditions per subcarrier.

Multicarrier communication apparatuses 400 and 500 according to this embodiment may also be modified and adapted as described below.

In this embodiment, a case has been described in which subcarriers composing a subcarrier group are determined adaptively according to inter-subcarrier correlation values, but the present invention is not limited to this case, and, for example, the number of subcarriers composing one subcarrier group may be determined beforehand, and the total number of subcarrier groups may be varied adaptively according to inter-subcarrier correlation values. Here, an example of a method of predetermining the number of subcarriers composing one subcarrier group is to assume a frequency selective fading environment, and predict the number of subcarriers with high correlation in that assumed environment.

This number of subcarriers composing one subcarrier group may also be made a different number when an OFDM signal is transmitted from a single antenna and when an OFDM signal is transmitted from a plurality of antennas. Specifically, the number of subcarriers may also be made smaller when transmitting from a plurality of antennas than when transmitting from a single antenna. This is because, when transmitting from a plurality of antennas, signals transmitted from the antennas each undergo frequency selective fading independently, and a combination of these results on the receiving side, so that the number of subcarriers with high correlation is smaller than in the case of single frequency selective fading.

Also, in this embodiment a case has been described in which, among an adjacent plurality of subcarriers, subcarriers with a high inter-subcarrier correlation value are grouped together, but the present invention is not limited to this case, and, for example, correlation values between non-adjacent subcarriers may be calculated, and predetermined numbers of subcarriers with high or low calculated inter-subcarrier correlation values may be grouped together.

Embodiment 3

In Embodiment 3 of the present invention, a delay spread is calculated for a received OFDM signal and subcarrier groups are determined based on the calculated delay spread in Embodiment 2.

Figure 16:
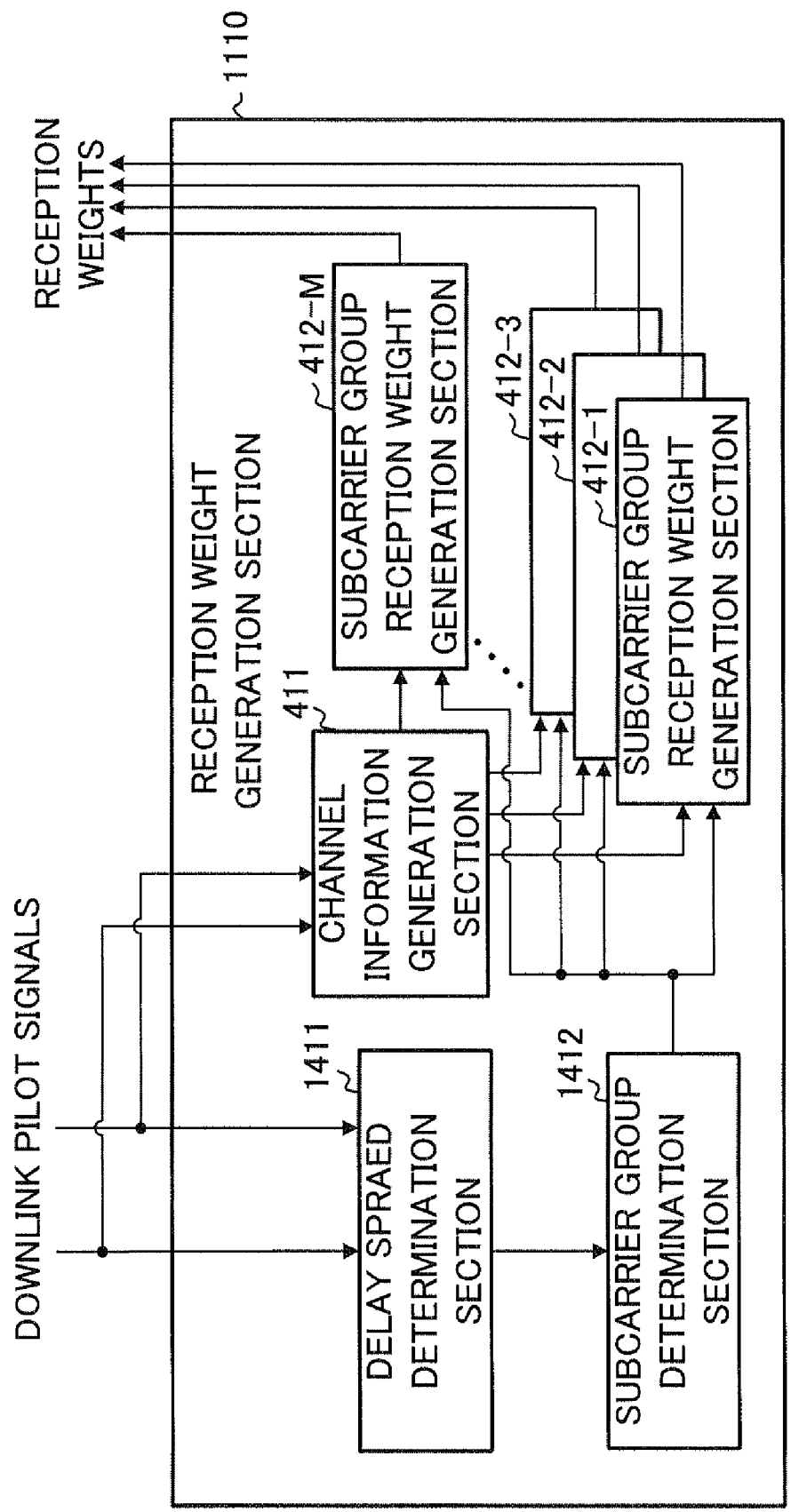
FIG. 16 is a block diagram showing the configuration of a reception weight generation section provided in a multicarrier communication apparatus according to Embodiment 3.

FIG. 16 is a block diagram showing the configuration of a reception weight generation section 1410 provided in a multicarrier communication apparatus according to this embodiment. Reception weight generation section 1410 is a configuration element in stead of reception weight generation section 410 in multicarrier communication apparatus 400. Reception weight generation section 1410 has delay spread determination section 1411 and subcarrier group determination section 1412 in addition to reception weight generation section 410. Therefore, since reception weight generation section 1410 has all the configuration elements provided in reception weight generation section 410, a description of such identical configuration elements is omitted in this embodiment to avoid duplication.

Delay spread determination section 1411 generates a delay profile, for example, as channel information per subcarrier based on a downlink pilot signal input from transmitting/receiving section 402, and calculates delay spread based on the generated delay profile. Then delay spread determination section 1411 inputs the calculated delay spread to subcarrier group determination section 1412.

Subcarrier group determination section 1412 determines subcarrier groups based on the delay spread input from delay spread determination section 1411. If delay spread is large, channel conditions fluctuate greatly within the band of an OFDM signal through the influence of frequency selective fading due to delayed waves, so that the number of subcarriers with a high inter-subcarrier correlation value is generally small.

On the other hand, if delay spread is small, the influence of frequency selective fading due to delayed waves is comparatively small, and therefore fluctuation of channel conditions within the band of an OFDM signal is also comparatively small, so that the number of subcarriers with a high inter-subcarrier correlation value is generally large.

Thus, in determining subcarrier groups, subcarrier group determination section 1412 makes the number of subcarriers grouped together smaller when delay spread input from delay spread determination section 1411 is large, and makes the number of subcarriers grouped together larger when delay spread input from delay spread determination section 1411 is small. Subcarrier group determination section 1412 then reports information on the determined subcarrier groups to subcarrier group reception weight generation section 412.

Figure 17:
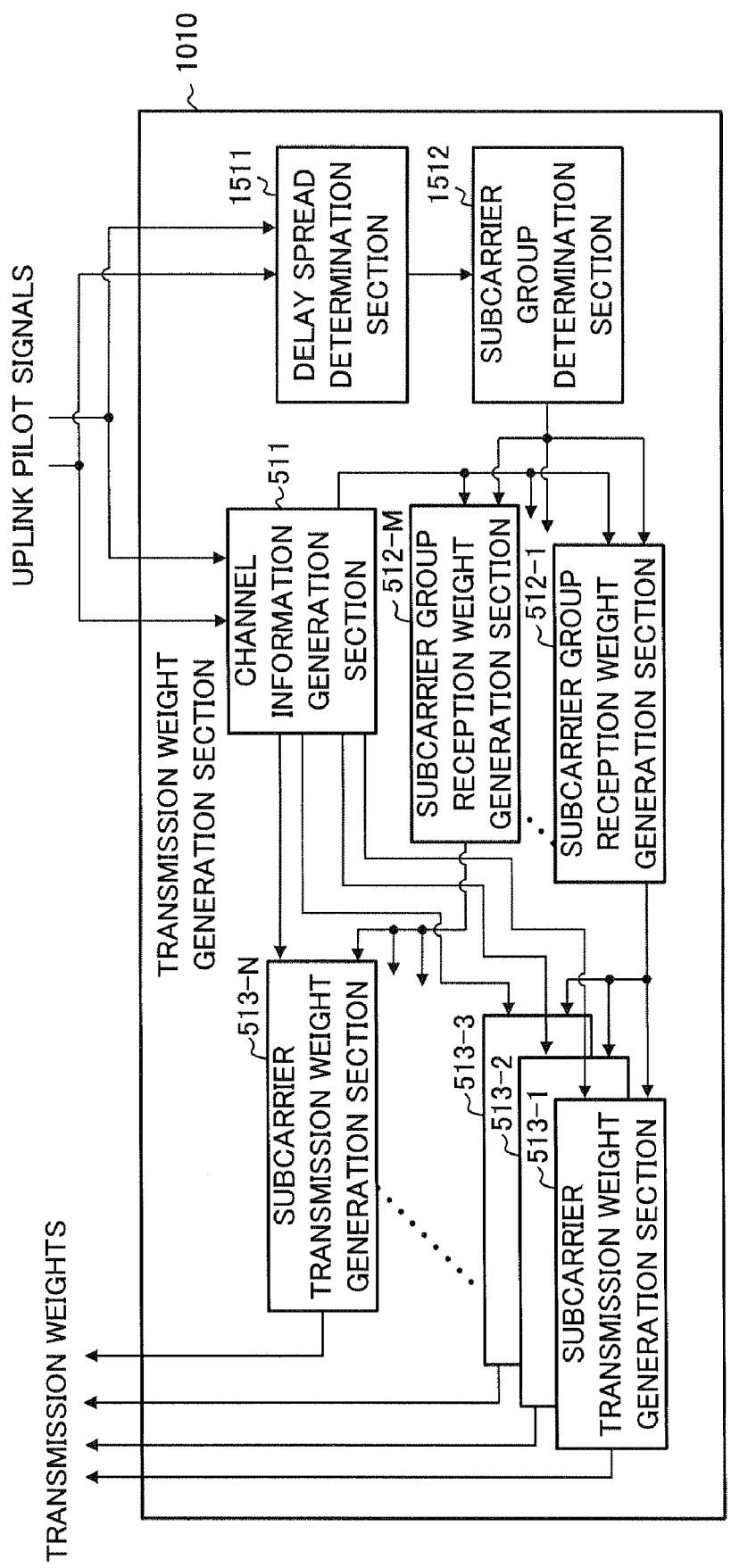
FIG. 17 is a block diagram showing the configuration of a transmission weight generation section provided in a multicarrier communication apparatus according to Embodiment 3.

FIG. 17 is a block diagram showing the configuration of a transmission weight generation section 1510 provided in a multicarrier communication apparatus according to this embodiment. Transmission weight generation section 1510 is a configuration element provided instead of transmission weight generation section 510 in multicarrier communication apparatus 500. Transmission weight generation section 1510 has a delay spread determination section 1511 and subcarrier group determination section 1512 in addition to the configuration elements of transmission weight generation section 510. Therefore, since transmission weight generation section 1510 has all the configuration elements provided in transmission weight generation section 510, a description of such identical configuration elements is omitted in this embodiment to avoid duplication.

Delay spread determination section 1511 generates a delay profile, for example, as channel information per subcarrier based on an uplink pilot signal input from transmitting/receiving section 502, and calculates delay spread based on the generated delay profile. Then delay spread determination section 1511 inputs the calculated delay spread to subcarrier group determination section 1512.

Subcarrier group determination section 1512 determines subcarrier groups based on the delay spread input from delay spread determination section 1511. Then subcarrier group determination section 1512 reports information on the determined subcarrier groups to subcarrier group reception weight generation section 512.

Thus, according to this embodiment, reception weight generation section 1410 or transmission weight generation section 1510 calculates delay spread for a downlink or uplink, and adjusts the number of subcarriers composing a subcarrier group according to the calculated delay spread, making it possible to respond to frequency selective fading conditions adaptively.

In this embodiment, both reception weight generation section 1410 and transmission weight generation section 1510 are provided with a delay spread section, but the present invention is not limited to this case, and a delay spread section in either reception weight generation section 1410 or transmission weight generation section 1510 may calculate delay spread, and transmit this calculated delay spread to the other using a feedback channel. By this means, the number of subcarriers can be adjusted according to delay spread without delay spread being calculated at both the transmitting and receiving ends.

Delay spread can be calculated in a delay spread determination section using a plurality of delay profiles or using a specific delay profile. As a method of calculating delay spread using a plurality of delay profiles, for example, the respective delay spreads can be calculated from a plurality of delay profiles, and the delay spread determination section calculation result can be obtained by calculating the average of those delay spreads. In this case, provision can be made on an average basis for individual fading conditions within frequency selective fading that varies from antenna to antenna. Alternatively, the median value, spread, or the like of a plurality of delay spreads can be used. As a method of calculating delay spread using a specific delay spread, delay spreads can be calculated from a plurality of delay profiles, and the delay spread determination section calculation result can be obtained by detecting the maximum value among these. In this case, optimal provision can be made by taking the case with the worst fading conditions as a criterion within frequency selective fading that varies from antenna to antenna.

Embodiment 4

In Embodiment 4 of the present invention, multicarrier communication apparatus 400 and multicarrier communication apparatus 500 are each provided with one antenna, and transmit and receive OFDM signals in Embodiment 1. That is to say, in this embodiment a case is described in which multicarrier communication apparatus 400 and multicarrier communication apparatus 500 do not perform MIMO transmission.

Figure 18:
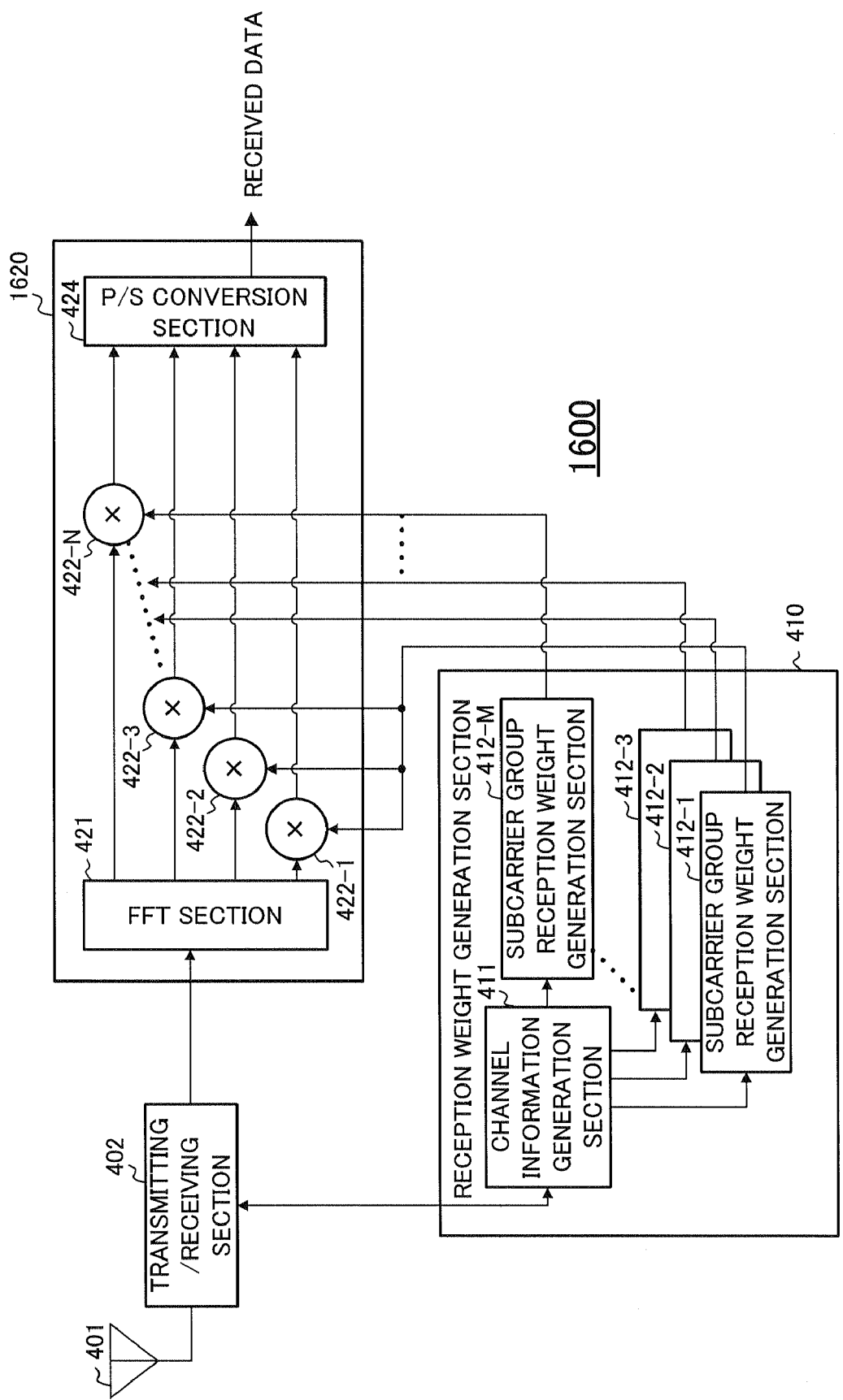
FIG. 18 is a block diagram showing the main configuration of a multicarrier communication apparatus according to Embodiment 4.

FIG. 18 is a block diagram showing the main configuration of a multicarrier communication apparatus 1600 according to this embodiment. In multicarrier communication apparatus 1600, one of antennas 401 has been eliminated from multicarrier communication apparatus 400, and with this reduction in antennas 401, the numbers of transmitting/receiving sections 402 and reception weighting sections 1620 have also each been reduced by one. Furthermore, with this reduction in antennas 401, adders 423 in reception weighting section 420 whose function has become unnecessary have also been eliminated in reception weighting section 1620. Therefore, since all the configuration elements in multicarrier communication apparatus 1600 are identical to configuration elements in multicarrier communication apparatus 400, a description of configuration elements in multicarrier communication apparatus 1600 is omitted in this embodiment to avoid duplication.

Figure 19:
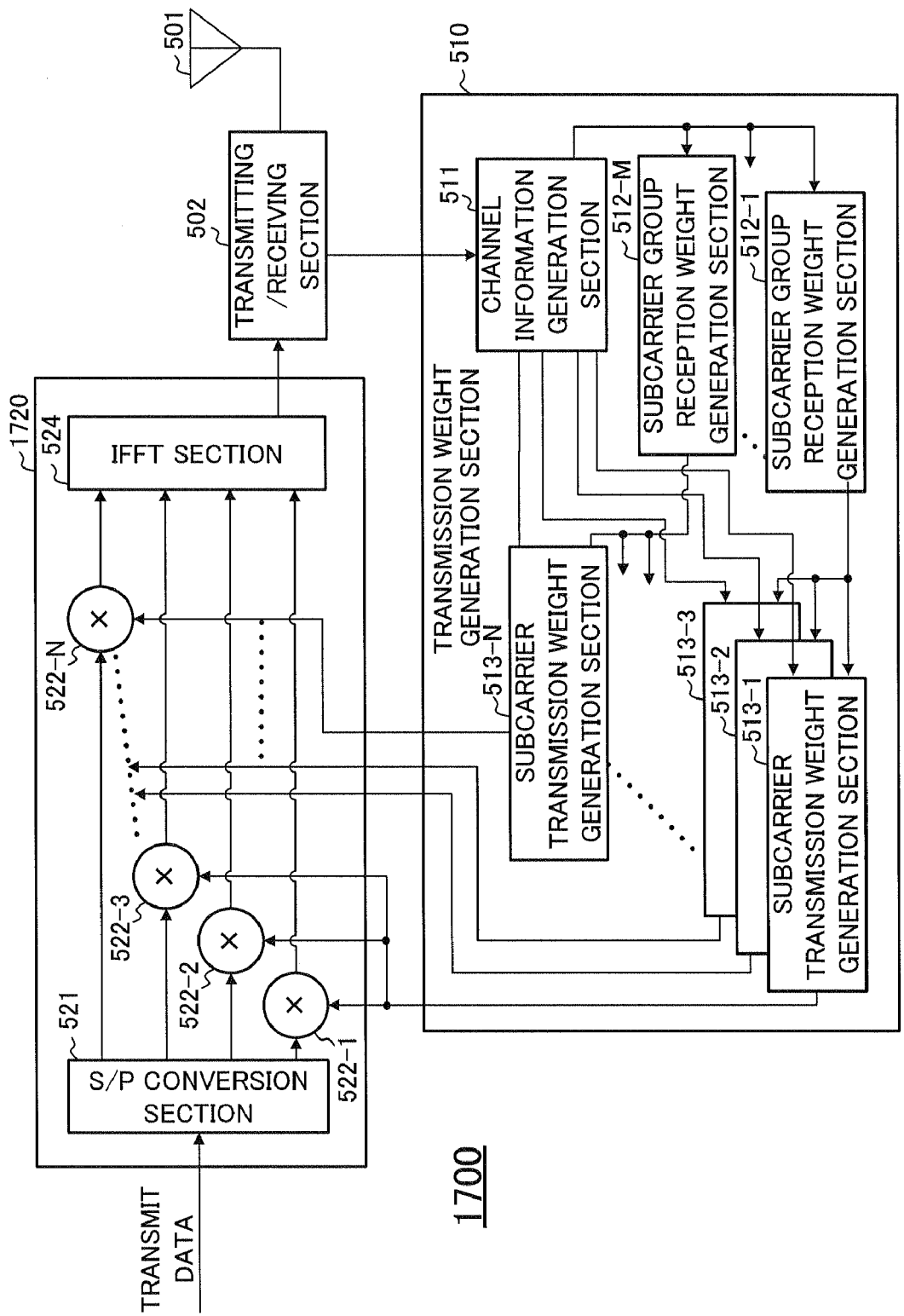
FIG. 19 is a block diagram showing the main configuration of a multicarrier communication apparatus according to Embodiment 4.

FIG. 19 is a block diagram showing the main configuration of a multicarrier communication apparatus 1700 according to this embodiment. In multicarrier communication apparatus 1700, one of antennas 501 has been eliminated from multicarrier communication apparatus 500, and with this reduction in antennas 501, the numbers of transmitting/receiving sections 502 and reception weighting sections 1720 have also each been reduced by one. Furthermore, with this reduction in antennas 501, adders 523 in reception weighting section 520 whose function has become unnecessary have also been eliminated in reception weighting section 1720. Therefore, since all the configuration elements in multicarrier communication apparatus 1700 are identical to configuration elements in multicarrier communication apparatus 500, a description of configuration elements in multicarrier communication apparatus 1700 is omitted in this embodiment to avoid duplication.

In this embodiment, multicarrier communication apparatus 1700 can calculate transmission weight $Wtx_n$ by means of Equation 4 below.

$$Wtx_n = \frac{H_n}{H_p} \quad \text{(Equation 4)}$$

Thus, according to this embodiment, similar effects to those of Embodiment 1 through Embodiment 3 can be achieved even when an OFDM signal is not transmitted using MIMO transmission.

In this embodiment a case has been described in which an OFDM signal is transmitted/received by one antenna by both the transmitting and receiving apparatuses, but the present invention is not limited to this case, and a case in which an OFDM signal is transmitted/received by either the transmitting or receiving apparatus using a plurality of antennas—that is, a case of transmission diversity or reception diversity—is also possible. In this case, performing transmission diversity or reception diversity for each subcarrier group enables the effects of this embodiment to be obtained in the case of diversity application.

The function blocks used in the descriptions of the above embodiments are typically implemented as LSIs, which are integrated circuits. These may be implemented individually as single chips, or a single chip may incorporate some or all of them.

Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technique whereby LSI is replaced by a different technique as an advance in, or derivation from, semiconductor technique, integration of the function blocks may of course be performed using that technique. The adaptation of biotechnology or the like is also a possibility.

The present application is based on Japanese Patent Application No. 2004-282671 filed on Sep. 28, 2004, entire content of which is expressly incorporated herein by reference.

INDUSTRIAL APPLICABILITY

A multicarrier communication apparatus and multicarrier communication method according to the present invention have an effect of improving the reception characteristics of a multicarrier signal while reducing the amount of computational processing necessary for calculating a reception weight by which that multicarrier signal is multiplied, and are useful for a mobile high-speed radio communication system in which MIMO transmission of an OFDM signal is performed, or the like.

The invention claimed is:
1. A multicarrier communication apparatus configured for transmitting a multicarrier signal, the multicarrier communication apparatus comprising:
a subcarrier group determination section that calculates an inter-subcarrier correlation value based on first channel information per subcarrier, and determines a number of subcarriers that compose one subcarrier group according to the calculated inter-subcarrier correlation value;
a transmission weight generation section that generates a transmission weight per subcarrier based on the first channel information per subcarrier and a reception weight per subcarrier group having the determined number of subcarriers;
a weighting section that performs weighting by multiplying a corresponding subcarrier by the generated transmission weight to generate a weighted multicarrier signal; and
a transmitting section that transmits the weighted multicarrier signal to a receiving communication apparatus.

2. The multicarrier communication apparatus according to claim 1, wherein the transmission weight generation section further comprises a reception weight generation section that:
generates the reception weight per subcarrier group having the determined number of subcarriers, based on second channel information of a subcarrier closest to a center frequency in the one subcarrier group; and
generates the transmission weight per subcarrier based on the generated reception weight and the first channel information per subcarrier.

3. The multicarrier communication apparatus according to claim 1, wherein the transmission weight generation section further comprises a reception weight generation section that:
generates the reception weight per subcarrier group having the determined number of subcarriers, based on an average of second channel information of subcarriers in the one subcarrier group; and
generates the transmission weight per subcarrier based on the generated reception weight and the first channel information per subcarrier.

4. The multicarrier communication apparatus according to claim 1, wherein the transmission weight generation section further comprises a reception weight generation section that:
generates the reception weight per subcarrier group having the determined number of subcarriers, based on second channel information of a subcarrier having a greatest received power in the one subcarrier group, and
generates the transmission weight per subcarrier based on the generated reception weight and the first channel information per subcarrier.

5. The multicarrier communication apparatus according to claim 1, wherein the transmission weight generation section further comprises a reception weight generation section that:
generates the reception weight per subcarrier group having the determined number of subcarriers, based on second channel information of a subcarrier having a greatest signal-to-interference power ratio or signal-to-noise ratio in the one subcarrier group; and
generates the transmission weight per subcarrier based on the generated reception weight and the first channel information per subcarrier.

6. The multicarrier communication apparatus according to claim 1, wherein the transmitting section further comprises a plurality of antennas, the weighted multicarrier signal being transmitted from the plurality of antennas.

7. A multicarrier communication apparatus configured for receiving a multicarrier signal, the multicarrier communication apparatus comprising:
a receiving section that receives a multicarrier signal weighted by multiplying each subcarrier by a transmission weight;
a channel information generation section that generates first channel information per subcarrier in the multicarrier signal received by the receiving section;
a subcarrier group determination section that calculates an inter-subcarrier correlation value based on the generated first channel information per subcarrier, and determines a number of subcarriers that compose one subcarrier group according to the calculated inter-subcarrier correlation value;
a reception weight generation section that generates a reception weight per subcarrier group having the determined number of subcarriers, based on the generated first channel information per subcarrier; and
a weighting section that performs weighting for the received multicarrier signal by multiplying each subcarrier group having the determined number of subcarriers by the generated reception weight.

8. The multicarrier communication apparatus according to claim 7, wherein the reception weight generation section generates the reception weight per subcarrier group having the determined number of subcarriers, based on second channel information of a subcarrier closest to a center frequency in the one subcarrier group.

9. The multicarrier communication apparatus according to claim 7, wherein the reception weight generation section generates the reception weight per subcarrier group having the determined number of subcarriers based on an average of generated second channel information of subcarriers in the one subcarrier group.

10. The multicarrier communication apparatus according to claim 7, wherein the reception weight generation section generates the reception weight per subcarrier group having the determined number of subcarriers, based on generated second channel information of a subcarrier having a greatest received power in the one subcarrier group.

11. The multicarrier communication apparatus according to claim 7, wherein the reception weight generation section generates the reception weight per subcarrier group having the determined number of subcarriers, based on second channel information of a subcarrier having a greatest signal-to-interference power ratio or signal-to-noise ratio in the one subcarrier group.

12. The multicarrier communication apparatus according to claim 7, wherein the receiving section further comprises a plurality of antennas, the multicarrier signal being received at the plurality of antennas.

13. A multicarrier communication method performed by a multicarrier signal transmitting apparatus, the multicarrier communication method comprising:
calculating an inter-subcarrier correlation value based on channel information per subcarrier, and determining a number of subcarriers that compose one subcarrier group according to the calculated inter-subcarrier correlation value;
generating a transmission weight per subcarrier based on the channel information per subcarrier and a reception weight per subcarrier group having the determined number of subcarriers;
performing weighting by multiplying a corresponding subcarrier by the generated transmission weight to generate a weighted multicarrier signal; and
transmitting, via radio, the weighted multicarrier signal to a receiving communication apparatus.

14. A multicarrier communication method performed by a multicarrier signal receiving apparatus, the multicarrier communication method comprising:
receiving a multicarrier signal weighted by multiplying each subcarrier by a transmission weight;
generating channel information per subcarrier in the received multicarrier signal;
calculating an inter-subcarrier correlation value based on the generated channel information per subcarrier, and determining a number of subcarriers that compose one subcarrier group according to the calculated inter-subcarrier correlation value;
generating a reception weight per subcarrier group having the determined number of subcarriers, based on the generated channel information per subcarrier; and
performing weighting for the received multicarrier signal by multiplying each subcarrier group having the determined number of subcarriers by the generated reception weight.

* * * * *